United States Patent
Sambhwani et al.

(10) Patent No.: US 8,081,997 B2
(45) Date of Patent: Dec. 20, 2011

(54) POWER AND/OR DATA RATE CONTROL BASED ON PILOT CHANNEL INFORMATION

(75) Inventors: Sharad Deepak Sambhwani, San Diego, CA (US); Stein Arne Lundby, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 641 days.

(21) Appl. No.: 12/017,287

(22) Filed: Jan. 21, 2008

(65) Prior Publication Data

US 2008/0214196 A1  Sep. 4, 2008

Related U.S. Application Data

(60) Provisional application No. 60/886,085, filed on Jan. 22, 2007.

(51) Int. Cl.
*H04W 52/18* (2009.01)
(52) U.S. Cl. ........................................ 455/522
(58) Field of Classification Search ........................ None
See application file for complete search history.

(56) References Cited

U.S. PATENT DOCUMENTS

| | | | | |
|---|---|---|---|---|
| 6,385,184 B2 * | 5/2002 | Kitade et al. | | 370/337 |
| 7,190,964 B2 | 3/2007 | Damnjanovic et al. | | |
| 7,369,501 B2 * | 5/2008 | Kim et al. | | 370/235 |
| 2005/0014523 A1 | 1/2005 | Pi et al. | | |
| 2007/0015476 A1 | 1/2007 | Akbar et al. | | |
| 2007/0286128 A1 * | 12/2007 | Bae et al. | | 370/335 |

FOREIGN PATENT DOCUMENTS

RU  2005135434  5/2006

OTHER PUBLICATIONS

International Search Report—PCT/US08/051711—International Search Authority, European Patent Office—Aug. 6, 2008.
Written Opinion—PCT/US08/051711—International Search Authority, European Patent Office—Aug. 6, 2008.
3rd Generation Partnership Project, "Physcial channels and mapping of transport channels onto physical channels (FDD)", 3GPP TS 25.211 V7.0.0 (Mar. 2006).
3rd Generation Partnership Project, "Spreading and modulation (FDD)", 3GPP TS 25.213 V6.3.0 (Jun. 2005).
3rd Generation Partnership Project, "Physical layer procedures (FDD)", 3GPP TS 25.214 V7.1.0 (Jun. 2006).
Translation of Office Action in Russian application 2009131732 corresponding to U.S. Appl. No. 12/017,287, citing US20050014523, US20070015476, RU2005135434 and US2003050084 dated Jan. 18, 2011.

* cited by examiner

*Primary Examiner* — Philip Sobutka
(74) *Attorney, Agent, or Firm* — Charles Chesney

(57) ABSTRACT

Systems and methodologies are described that facilitate pilot channel optimization schemes for high data rate communications transmissions. In various illustrative implementations, pilot channel operations can be monitored and controlled by an exemplary base station for one or more cooperating wireless terminals (e.g., user equipment) such that one or more power features of the one or more cooperating wireless terminals can be illustratively changed in response to one or more selected pilot channel operational conditions. In an illustrative operation, an exemplary base station can engage one or more selected pilot channel control operations as part of pilot channel optimization comprising a jump detection technique, operating power control on another channel other than the DPCCH, engaging in delayed power control, engaging in a soft-handoff power control in the instance of a boosted pilot channel, and resolving ambiguity in grant messages resulting from a pilot boost.

44 Claims, 16 Drawing Sheets

POWER AND/OR DATA RATE CONTROL BASED ON PILOT CHANNEL INFORMATION

CROSS-REFERENCE TO RELATED APPLICATIONS

This application clams the benefit of priority under 35 U.S.C Section 119 from U.S. Provisional Patent Application Ser. No. 60/886,085 entitled "BOOSTED UPLINK PILOT IN W-CDMA", filed on Jan. 22, 2007, the entirety of which is incorporated herein by reference.

BACKGROUND

I. Field

The following description relates generally to wireless communications, and more particularly to an improved uplink pilot.

II. Background

Wireless communication systems are widely deployed to provide various types of communication; for instance, voice and/or data may be provided via such wireless communication systems. A typical wireless communication system, or network, can provide multiple users access to one or more shared resources. For instance, these systems may be multiple-access systems capable of supporting communication with multiple users by sharing the available system resources (e.g., bandwidth and transmit power). Examples of such multiple-access systems include code division multiple access (CDMA) systems, lime division multiple access (TDMA) systems, frequency division multiple access (FDMA) systems, and orthogonal frequency division multiple access (OFDMA) systems.

Coherent demodulation of a data channels typically relies on the derivation of the phase and amplitude changes introduced by the transmission link. Generally, higher data rates on a transmission link require a better phase and amplitude reference in order to perform well. This amplitude and phase reference is usually given by a pilot sequence or channel.

As an example, a data rate of sixteen (16) kilo-bits per second (Kb/s) transmitted the uplink of W-CDMA will require a pilot channel with a signal-to-noise ratio (SNR) of approximately Ec/Nt=−20 dB. On the other hand, if the data rate is increased to eleven (11) mega-bits per second (Mbit/s) the signal-to-noise ratio of the channel carrying the pilot (denoted "dedicated physical control channel", or DPCCH) should be approximately Ec/Nt=−2 dB. This higher SNR can be achieved by increasing the transmit power of the DPCCH at the transmitter.

Current and prior releases of W-CDMA do not allow the possibility for the user equipment (UE) to autonomously vary the transmit power of the pilot channel in order to accommodate an increase in the transmitted data rate, thus leading to inefficiencies. With the introduction of even higher data rates on the uplink (UL) in contemplated future releases of W-CDMA and other systems, these inefficiencies can be more significant, barring support for the communication of high data rates.

With current practices, the up and down commands issued by the inner-loop of the fast power control is based on the SNR measure on the pilot bits at the base station. Unfortunately, current deployments of base stations in current versions of W-CDMA cannot differentiate the following from each other: a) an increase in the transmit power of the DPCCH initiated by the UE (i.e., because of the high data rate transmission), and b) an improvement in the radio link (better path loss, reduction in interference level). In both scenarios the systems observe that the SNR of the pilot is increased beyond the target SNR, and issue a down command. The correct behavior would be for the base station to only issue a down command for the case where there is an improvement in the radio link.

Moreover, with current practices, when the bases stations issue a down command in the case of an increase in the transmit power of the DPCCH, the base station operates to effectively reduce the SNR for the high data rate transmission and thereby degrades its performance. Furthermore, with current practices, after the UE has finished transmitting the high rate packet, improved efficiencies (e.g., boost) in the pilot transmit power will be removed since the UE, having executed the undesirable down commands, results in a pilot with a low SNR such that lower data rate transmissions can fail.

From the foregoing, it is appreciated that there exists a need for system and methods to ameliorate the shortcomings of existing practices.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more illustrative implementations and corresponding disclosure thereof, various aspects are described in connection with facilitating adaptive uplink pilot multiplexing. In various embodiments, uplink pilots can be optimized for high speed transmissions by managing grant messages processed on the pilot channel.

According to related aspects, a method that facilitates the promotion of pilot efficiencies is described herein. The method can include determining uplink pilot channel information in a base station. Further, the method can include transmitting the uplink pilot channel information to one or more cooperating wireless terminals to facilitate uplink pilots according to a predetermined function of the one or more cooperating terminals. In an illustrative implementation, a base station is provided operable to communicate pilot channel data between cooperating wireless terminals such that the pilot channel data is processed by the cooperating wireless terminals as part of pilot channel optimization.

In an illustrative operation, the exemplary base station can monitor the pilot channel and can detect a jump in its (signal to noise ration) level. In the illustrative operation, if the exemplary base station detects an increase in the pilot level of more than a selected decibel value from a previously transmitted time slot, the exemplary base station operates in a selected power control mode. Illustratively, the selected power control mode comprises ignoring the SNR measures during the next lime transmission interval (TTI).

In another illustrative operation, where the exemplary base station knows the level of an exemplary boost to the pilot signal, the exemplary base station can operate to normalize the measured pilot SNR to compensate for the pilot boost. In the illustrative implementation, the normalized SNR can then be used by an exemplary power control inner-loop. In the illustrative operation, the exemplary base station can estimate the pilot boost by comparing the pilot SNR received during a boosted timeslot to the pilot SNR received during a time when it was not boosted. Operatively, the result of this estimate can be used to normalize the measured SNR.

In another illustrative operation, an exemplary base station can disable power control on the first slot of a wireless transmission that may have a boosted pilot, operating under the assumption that the normalized SNR did not change from the previous time slot. Illustratively, operatively, during one or more subsequent time slots the exemplary base station can use the difference between successive time slots to update an estimate of the normalized SNR. The normalized SNR can then be used by the inner-loop power control.

In another illustrative operation, an exemplary base station can measure the power or SNR received on a control channel, such as the enhanced dedicated physical control channel (E-DPDCH) of W-CDMA. Illustratively, operatively, if the exemplary base station detects a substantial power presence from the wireless terminal, the exemplary base station can operate to render the pilot as being able to be boosted and performs one or more of selected power mode operations.

In another exemplary operation, upon the detection of a signal by the exemplary base station of a signal on a control channel or a data channel, power control can be operated on the control channel. For example, in W-CDMA the control channel may be the enhanced dedicated physical control channel (E-DPCCH) and the data channel may be the enhanced dedicated physical data channel (E-DPDCH). Illustratively, the SNR of the control channel can be estimated by the exemplary base station and used for inner-loop power control. Illustratively, operatively, the estimated SNR of the control channel can be adjusted to represent the power of the normalized pilot and power control can be illustratively operated employing the adjusted SNR estimate.

In another illustrative operation, the exemplary base station can disable power control at the beginning of every TTI where the user equipment (UE) (e.g., one or more cooperating wireless terminals) may transmit with a boosted pilot. The exemplary base station can operatively determine when the UE may transmit with a boosted pilot because the exemplary base station can provide control over the UE transmissions through one or more message grants, and through DTX control. Illustratively, the power control can be re-enabled when the exemplary base station decodes the control channel (E-DPCCH in W-CDMA). In the illustrative operation, the control channel can communicate which format is being transmitted from the exemplary base station and the one or more wireless transmitters as well as whether the UE is boosting the pilot. In the illustrative operation, the exemplary base station can utilize the result of decoding the control channel to normalize the pilot SNR estimate.

In another illustrative implementation, the exemplary base station can disable power control in the event that the UE operates to boost the pilot. Illustratively, the exemplary base station can monitor the instance which the UE operates to boost the pilot and limit their frequency in occurrence by communication of grant messages to one or more UEs. In an illustrative implementation, the exemplary base station can transmit to one or more wireless terminals an absolute grant message to allow the one or more wireless terminals (e.g., UEs) to transmit a high data rate utilizing a boosted pilot for a specific TTI.

To the accomplishment of the foregoing and related ends, the one or more illustrative implementations comprise the features hereinafter fully described and particularly pointed out in the claims. The following description and the annexed drawings set forth in detail certain illustrative aspects of the one or more illustrative implementations. These aspects are indicative, however, of but a few of the various ways in which the principles of various illustrative implementations can be employed and the described illustrative implementations are intended to include all such aspects and their equivalents.

DETAILED DESCRIPTION

Figure 1:
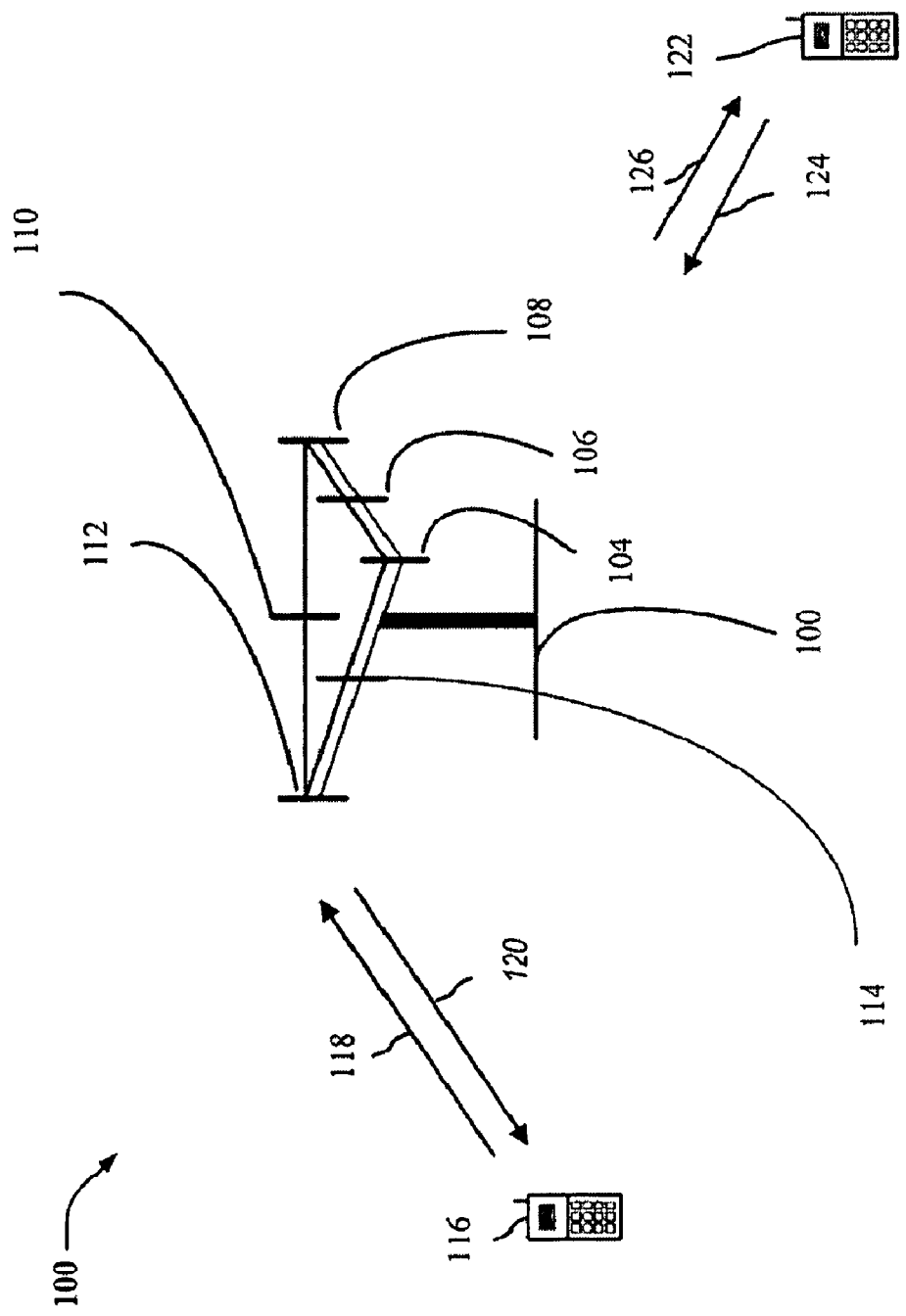
FIG. 1 illustrates a wireless communication system in accordance with various aspects set forth herein.

Various embodiments are now described with reference to the drawings, wherein like reference numerals are used to refer to like elements throughout, in the following description, for purposes of explanation, numerous specific details are set forth in order to provide a thorough understanding of one or more embodiments. It may be evident, however, that such embodiments can be practiced without these specific details. In other instances, well-known structures and devices are shown in block diagram form in order to facilitate describing one or more embodiments.

In addition, various aspects of the present invention are described below. It should be apparent that the teaching herein may be embodied in a wide variety of forms and that any specific structure and/or function disclosed herein is merely representative. Based on the teachings herein one skilled in the art should appreciate that an aspect disclosed herein may be implemented independently of any other aspects and that two or more of these aspects may be combined in various ways. For example, an apparatus may be implemented and/or a method practiced using any number of the aspects set forth herein. In addition, an apparatus may be implemented and/or a method practiced using other structure and/or functionality in addition to or other than one or more of the aspects set forth herein. As an example, many of the methods, devices, systems and apparatuses described herein are descried in the context of boosting uplink pilot signals in a W-CDMA communications system. One skilled in the art should appreciate that similar techniques could apply to other communication environments.

As used in this application, the terms "component" "module," "system," and the like are intended to refer to a computer-related entity, either hardware, firmware, a combination of hardware and software, software, software in execution, firmware, middle ware, microcode, and/or any combination thereof. For example, a component can be, but is not limited to being, a process running on a processor, a processor, an object, an executable, a thread of execution, a program, and/or a computer. By way of illustration, not limitation, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complemented by additional components in order to facilitate achieving the various aspects, goals, advantages, etc., described with regard thereto, and are not limited to the precise configurations set forth in a given FIG., as will he appreciated by one skilled in the art.

Furthermore, various embodiments are described herein in connection with a wireless terminal or user equipment (UE). A wireless terminal or UE can also be called a system, subscriber unit, subscriber station, mobile station, mobile, mobile device, remote station, remote terminal, UE, user terminal, terminal, wireless communication device, user agent, or user device. A wireless terminal or UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with wireless terminal(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. Additionally it should be appreciated that a carrier wave can be employed to carry computer-readable electronic data or instructions such as those used in transmitting and receiving voice mail, in accessing a network such as a cellular network, or in instructing a device to perform a specified function. Accordingly, the term "machine-readable medium" can include, without being limited to, wireless channels and various other media capable of storing, containing, and/or carrying instruction(s) and/or data. Of course, those skilled in the art will recognize many modifications may be made to the disclosed embodiments without departing from the scope or spirit of the invention as described and claimed herein.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA), TD-SCDMA, and TD-CDMA. cdma2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the above techniques may be described below in the context of uplink pilot multiplexing as it applies to LTE, and as a result, 3GPP terminology may be used in much of the descriptions below, where appropriate.

Pilot Channel Boost:

The herein described systems and methods aim to ameliorate the shortcomings of existing practices to optimize pilot channel operations and to mitigate the occurrence where a lack of control of the power of the pilot channel renders high data rate transmissions as futile. In an illustrative implementation, UEs are provided the ability to autonomously increase (boost) the level of the channel carrying the pilot. For example, in W-CDMA this channel is called the Dedicated Physical Control Channel (DPCCH). In an illustrative operation, the UE can increase the transmit power of the DPCCH as a function of the transmission format the UE uses on the data channel—i.e., as a function of the data rate of the data channel. Illustratively, after the data transmission is over, the UE can illustratively operate to decrease the power of the DPCCH by die amount of the boost in order to resume operation at the normal power level.

In another illustrative implementation, the level of a control channel can be increased (boosted), such as die Enhanced Dedicated Physical Control Channel in W-CDMA. In an illustrative operation, the E-DPCCH can be first decoded, then the modulation symbols are flipped according to a selected scheme to transform the E-DPCCH into a pilot reference. In the illustrative operation the E-DPCCH can then be then combined with the DPCCH to provide an improved phase and amplitude reference for demodulating other channels such as the DPDCH.

In an illustrative implementation, fast power control can be deployed to mitigate rapid changes in the pilot channel SNR at the receiver due to variations of the propagation channel and level of interference. Illustratively, fast power control, as is currently used on the uplink of W-CDMA, generally relics on two loops: the inner loop and the outer loop. In an illustrative operation, the inner loop can perform an operation where an exemplary base station (e.g., Node B, KNC, or other infrastructure element) operatively measures the SNR of the pilot bits and compares the measured SNR to a target SNR to issue an UP or DOWN command to one or more cooperating wireless terminals (e.g., user equipment—UE) based on this comparison so as to maintain the measured SNR close to the target SNR. Illustratively, when the UE receives an UP command, it can operatively increase the power of its channels by a step-size. Illustratively, when the UE receives a DOWN command from any of the cells (e.g., cooperating base stations) in its active-set of cooperating cells, it can operatively decrease the power of the channels by a step-size.

However, with current practices, the up and down commands issued by the inner-loop of the fast power control is generally based on the SNR measure on the pilot bits at the base station. W-CDMA base stations are inoperative to differentiate the following from each other: a) an increase in the transmit power of the DPCCH initiated by the UE because it is transmitting a high data rate transmission, and b) an improvement in the radio link (better path loss, reduction in interference level, other). With current practices, in both cases the base station observes that the SNR of the pilot is increased beyond the target SNR, and issues a down command. However, the desired behavior would be for the base station to issue a down command only for case (b).

By issuing a down command in case (a) the base station reduces the SNR for the high data rate transmission and thereby degrades its performance. Furthermore, after the UE has finished transmitting the high rate packet the boost in the pilot transmit power will stop. As such, the UE having executed the undesirable down commands, the pilot may be at such a low SNR that any lower data rate transmissions may fail.

To overcome the shortcomings of existing inner-loop practices, the herein described systems and methods provide a wireless communications system where an exemplary base station illustratively operatively measures the pilot and detects a jump in its level. In an illustrative operation, if the exemplary base station detects an increase in the pilot level of more than $\Delta$ dB from the previously observed time slot, the exemplary base station operatively stores data representative of a boosted pilot. In die illustrative operation, the exemplary base station operates the power control loop in conventional manner and can operate to perform one or more of the following illustrative operations to detect a possible boosted pilot and switches the power control to operate in one of the modes as described by the following illustrative operations.

In an illustrative operation, the exemplary base station can monitor the pilot channel and can detect a jump in its (signal to noise ration) level. In the illustrative operation, if the exemplary base station detects an increase in the pilot level of more than a selected decibel value from a previously transmitted time slot, the exemplary base station operates in a selected power control mode. Illustratively, the selected power control mode comprises ignoring the SNR measures during the next time transmission interval (TTI), and transmitting power control commands to one or more UEs such that the one or more UEs will not change its average transmit power.

In another illustrative operation, where the exemplary base station knows the level of an exemplary boost to the pilot signal, the exemplary base station can operate to normalize the measured pilot SNR to compensate for the pilot boost. In the illustrative implementation, the normalized SNR can then be used by an exemplary power control inner-loop. In the illustrative operation, the exemplary base station can estimate the pilot boost by comparing the pilot SNR received during a boosted timeslot to the pilot SNR received during a time when it was not boosted. Operatively, the result of this estimate can be used to normalize the measured SNR.

In another illustrative operation, exemplary base station can disable power control on the first slot of a wireless transmission that may have a boosted pilot, operating under the assumption that the normalized SNR did not change from the previous time slot. Illustratively, operatively, during one or more subsequent time slots an exemplary base station can use the difference between successive time slots to update an estimate of the normalized SNR. The normalized SNR can then be used by the inner-loop power control.

In another illustrative operation, an exemplary base station can measure the power or SNR received on the enhanced dedicated physical control channel (E-DPDCH). Illustratively, operatively, if the exemplary base station detects a substantial power presence from the one or more UEs, the exemplary base station can operate to render the pilot as being able to be boosted and performs one or more of selected power mode operations.

In another exemplary operation, upon the detection of a signal by the exemplary base station of a signal on the enhanced dedicated physical control channel (E-DPCCH) or the enhanced dedicated physical data channel (E-DPDCH), power control can be operated on the E-DPCCH. Illustratively, the SNR of the E-DPCCH can be estimated by the exemplary base station and used for inner-loop power control. Illustratively, operatively, the estimated SNR of the E-DPCCH can be adjusted to represent the power of the normalized DPCCH and power control can be illustratively operated employing the adjusted SNR estimate.

In another illustrative operation, the exemplary base station can disable power control at the beginning of every TTI where the user equipment (UE) may transmit with a boosted pilot. The exemplary base station can operatively determine when the UE may transmit with a boosted pilot because the exemplary base station can provide control over the UE transmissions through one or more message grants, and through DTX control. Illustratively, the power control can be re-enabled when the exemplary base station decodes the E-DPCCH. In the illustrative operation, the E-DPCCH can communicate which format is being transmitted from the exemplary UE as well as whether the UE is using a pilot boost on the E-DPDCH. In the illustrative operation, die exemplary base station can utilize the result of the E-DPCCH to normalize the DPCCH pilot SNR estimate.

In another illustrative implementation, the exemplary base station can disable power control in the event that the UE operates to boost the pilot. Illustratively, the exemplary base station can monitor the instance which the UE operates to boost the pilot and limit their frequency in occurrence by communication of grant messages to one or more cooperating wireless terminals. In an illustrative implementation, the exemplary base station can transmit to one or more wireless terminals an absolute grant message to allow the one or more wireless terminals (e.g., UEs) to transmit a high data rate utilizing a boosted pilot for a specific TTI.

In another illustrative implementation, UEs can operatively ignore "down" commands from non-serving cells when they are transmitting a boosted pilot.

In the illustrative operation, the outer loop can perform an operation where an exemplary base station operatively measures the quality of service (QoS) of the received data from one or more cooperating wireless terminals (e.g., the block error rate (BLER) or bit error rate (BER)) and can adjust the target SNR as necessary such as to reach a desired QoS. Also, in the illustrative implementation, a measure of the SNR on the pilot can be used to derive variations in the quality of the radio link to adjust the transmit power of the channels that are transmitted by the UE.

With the enhanced uplink (EUL) feature of W-CDMA, data can generally be transmitted on a channel named the E-DPDCH. Operatively, illustratively, the pilot reference can be still carried on the DPCCH and can be used for coherent demodulation of the E-DPDCH as well as other channels. The uplink in a wireless system is a resource shared by cooperating UEs. Illustratively, an exemplary base station can maximize the overall uplink performance by controlling the amount of uplink resources used by each individual UE. In an illustrative implementation, absolute grant messages can be deployed to achieve the desired uplink resource control.

Illustratively, an absolute grant message is a message sent on the downlink by a base station scheduler to directly adjust the granted rate of one UE under its control. Illustratively, the absolute grant message itself con include multiple fields that are multiplexed together, and transmitted on a downlink channel named the E-AGCH. These fields can comprise: Absolute Grant Value—this field indicates the maximum EUL data to pilot ratio (E-DPDCH/DPCCH) that the UE is allowed to use in the next transmission; Absolute Grant Scope: this field indicates the applicability of the Absolute Grant. (It can take two different values, "Per HARQ process" or "All HARQ processes", which can indicate whether the HARQ process activation/de-activation will affect one or all processes.

To overcome the ambiguity resulting in the communication of absolute grant messages sent by the exemplary base station and cooperating wireless terminals, the pilot boost with the DPDCH to nominal DPCCH power ratio can be combined into a new absolute message metric, where, illustratively, the nominal DPCCH power is the power of the DPCCH had it not been boosted.

Illustratively the absolute grant message metric can computed as follows:

$$m=[(\text{E-DPDCH power})+(\text{boosted DPCCH power})]/[\text{Nominal DPCCH power}]-1 \quad \text{(Eq. 1)}$$

Or, equivalently:

$$m=\beta_{ed}/\beta_c+\beta_{bc}-1 \text{ (computed in linear domain)} \quad \text{(Eq. 2)}$$

Where $\beta_{ed}$ and $\beta_c$ are the amplitude gains of the E-DPDCH and DPCCH respectively, and where $\beta_{bc}$ is the amplitude ratio of the boosted DPCCH to the nominal DPCCH.

Although these equations are written in linear and in amplitude it should he well understood by someone skilled in the art that they could be derived by any other way such as to take into account the boost in power in the metric. For example, powers could be used instead, or the computation could occur in logarithmic domain.

In another illustrative implementation where the power of a channel other than the pilot is boosted, the same procedure to compute the new absolute message metric can be used, but on the other channel. In one particular embodiment where the power of the E-DPCCH is boosted and used as additional phase and amplitude reference, the metric can be computed as:

$$m=[(\text{E-DPDCH power})+(\text{boosted E-DPCCH power})-(\text{normal E-DPCCH power})]/[\text{Nominal DPCCH power}] \quad \text{(Eq. 3)}$$

Or, equivalently:

$$m=\beta_{ed}/\beta_c+(\beta_{bec}-\beta_{ec})/\beta_c=A_{ed}+A_{b\text{-}ec}-A_{ec}=A_{ed}+B_{ec\_boost} \text{ (computed in linear domain)} \quad \text{(Eq. 4)}$$

Where $\beta_{ed}$, $\beta_c$, and $\beta_{ec}$ are the amplitude gains of the E-DPDCH, DPCCH, and E-DPCCH respectively, where $\beta_{bec}$ is the amplitude gain of the boosted E-DPCCH, where $A_{ed}$ and $A_{ec}$ are the amplitude ratio of the E-DPDCH to DPCCH and un-boosted E-DPCCH to DPCCH respectively, where $A_{b\text{-}ec}$ is the amplitude ratio of the boosted E-DPCCH to DPCCH, and where $B_{ec\_boost}$ is the ratio of the amplitude increase due to boosting the E-DPCCH to the amplitude of the DPCCH.

Although these equations are written in linear and in amplitude it should be well understood by someone skilled in the an that they could be derived by any other way such as to take into account the boost in power in the metric. For example, powers could be used instead, or the computation could occur in logarithmic domain.

In an illustrative operation, the power of channels other than the DPCCH can be set relative to the power of the DPCCH. Illustratively, an increase in 1 dB in the DPCCH power can result in a power increase for other channels by 1 dB. In the illustrative operation, if power boost is deployed, the UE operatively sets the power of channels other than the DPCCH relative to the nominal DPCCH, i.e., the power of the DPCCH if it had not been boosted. In the illustrative operation, the DPCCH power can be arbitrarily boosted without affecting the power of the other channels transmitted by the UE. Illustratively, also, the power of the E-DPDCH can be adjusted and specified relative to the nominal DPCCH power, or relative to the boosted DPCCH power. In the illustrative operation, data can be transmitted by one or more cooperating wireless terminals on the E-DPDCH in fixed intervals of time (e.g., transmit time intervals (TTI)).

Pilot Channel Optimization:

Referring now to FIG. 1, a multiple access wireless communication system according to one embodiment is illustrated. Base station 100 (BS) includes multiple antenna groups, one including 104 and 106, another including 108 and 110, and an additional including 112 and 114. In FIG. 1, only two antennas are shown for each antenna group, however, more or fewer antennas may be utilized for each antenna group. User equipment 116 (UE) is in communication with antennas 112 and 114, where antennas 112 and 114 transmit information to UE 116 over downlink 120 and receive information from UE 116 over uplink 118. UE 122 is in communication with antennas 106 and 108, where antennas 106 and 108 transmit information to UE 122 over downlink 126 and receive information from UE 122 over uplink 124. In a FDD system, communication links 118, 120, 124 and 126 may use different frequency for communication. For example, downlink 120 may use a different frequency than that used by uplink 118.

Each group of antennas and/or the area in which they are designed to communicate is often referred to as a sector of the base station. In the illustrative implementation, antenna groups each are designed to communicate to UEs in a sector of the areas covered by base station 100.

In communication over downlinks 120 and 126, the transmitting antennas of base station 100 may utilize beamforming in order to improve the signal-to-noise ratio of downlinks for the different UEs 116 and 124.

As described above, a base station may be a fixed station used for communicating with the terminals and may also be referred to as an access point, a Node B, or some other terminology. A user equipment (UE) may also be called an access terminal, a wireless communication device, terminal, or some other terminology.

Figure 2:
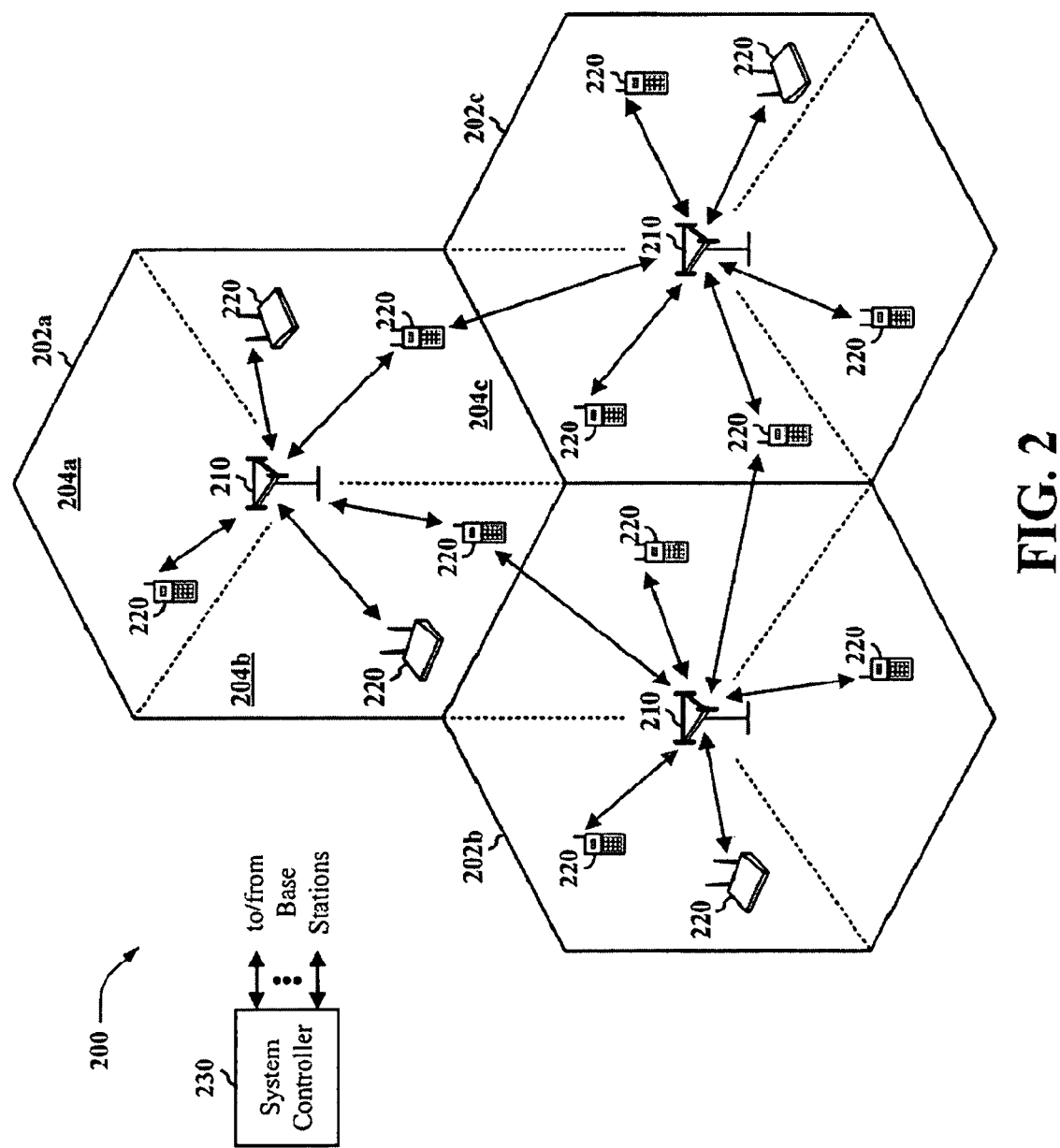
FIG. 2 illustrates a wireless communication system in accordance with further aspects of the present invention.

FIG. 2 illustrates a wireless communication system 200 with multiple base stations 210 and multiple user equipments (UEs) 220 as may be utilized in conjunction with one or more aspects of the herein described systems and methods. A base station is generally, although not necessarily, a fixed station that communicates with the terminals and may also be called an access point, a Node B, or some other terminology. Each base station 210 provides communication coverage for a particular geographic area, illustrated as three geographic areas, labeled 202a, 202b, and 202c. The term "cell" can refer to a base station and/or its coverage area depending on the context in which the term is used. To improve system capacity, a base station coverage area may be partitioned into multiple smaller areas (e.g., three smaller areas, according to coverage area 202a in FIG. 2), 204a, 204b, and 204c. Each smaller area can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein may be used for a system with sectorized cells as well as a system with un-sectorized cells. For simplicity, in the following description, the term "base station" is used generically for a fixed station that serves a sector as well as a fixed station that serves a cell.

User equipments 220 are typically dispersed throughout the system, and each UE may be fixed or mobile. A UE may also be called a mobile station, terminal, a user device, or some other terminology. A UE may be a wireless device, a cellular phone, a personal digital assistant (PDA), a wireless modem card, and so on. Each terminal 220 may communicate with zero, one, or multiple base stations on the downlink and uplink at any given moment. The downlink (or forward link) refers to the communication link from the base stations to the terminals, and the uplink (or reverse link) refers to the communication link from the terminals to the base stations.

For a centralized architecture, a system controller 230 couples to base stations 210 and provides coordination and control for base stations 210. For a distributed architecture, base stations 210 may communicate with one another as needed. Additional channels of the downlink (e.g., control channel) may be transmitted from multiple base stations to one UE. Uplink data communication may occur from one UE to one or more base stations via one or more antennas at the terminals 220 and or at the base stations 210, as described above with respect to FIG. 1.

Figure 3A:
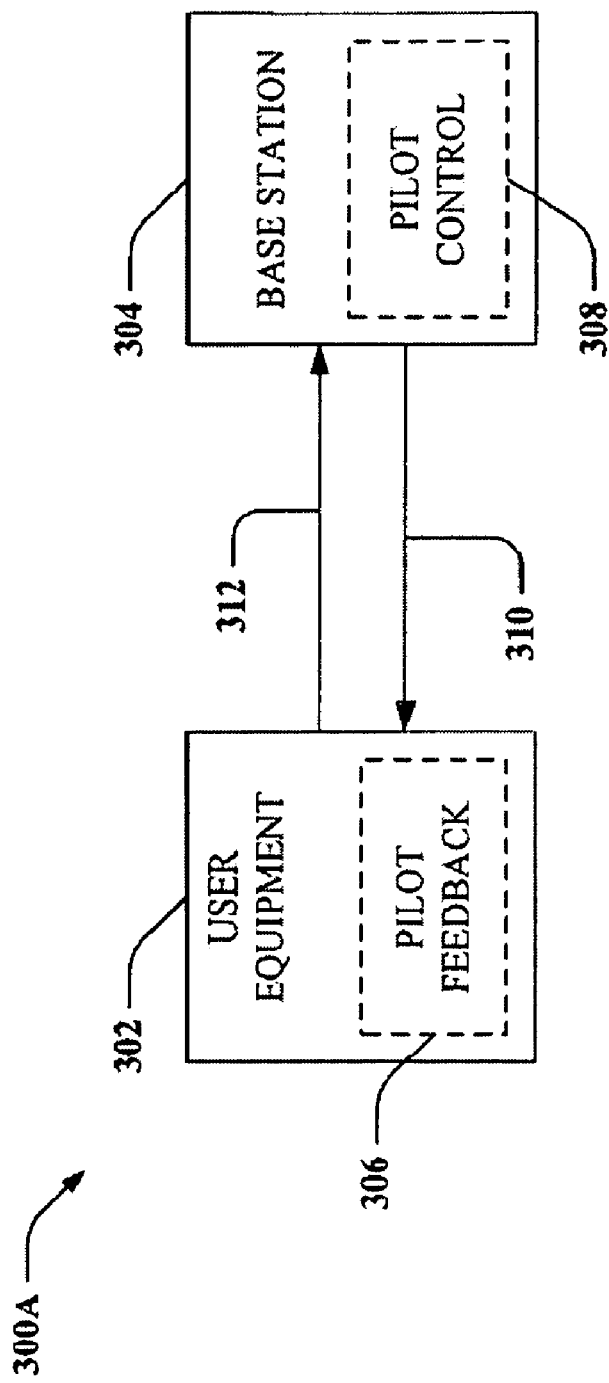
FIG. 3A illustrates an exemplary non-limiting high-level block diagram of a system that facilitates pilot channel optimization according to various aspects of the present invention.

FIG. 3A illustrates an exemplary non-limiting high-level block diagram of a system that facilitates pilot channel optimization according to various aspects of the herein described systems and methods. The system 300A includes user equipment 302 that is communicatively coupled to a base station 304 in a wireless manner. In other words, base station 304 is providing voice and/or data services to UE 302 over a downlink 310 and receiving communications from user equipment 302 over an uplink 312, such as a CDMA or single carrier frequency division multiple access (SC-FDMA) uplink. User equipment 302 can be mobile in nature, such that quality associated with signals received from base station 304 can vary as UE 302 translates to a different geographic region. User equipment 302 can include a pilot feedback mechanism 306 which is responsive to control one or more power operations of die user equipment responsive to instructions provided by pilot control mechanism 308 located at base station 305 that operatively monitors pilot signals in accordance with the schemes discussed herein to enable channel condition estimation among other functions. In addition, it should be appreciated that UE 302 and/or base station 304 can include other ancillary components which facilitates, among other functions, communication of associated information or data used to adaptively determine die pilot allocation scheme.

Figure 3B:
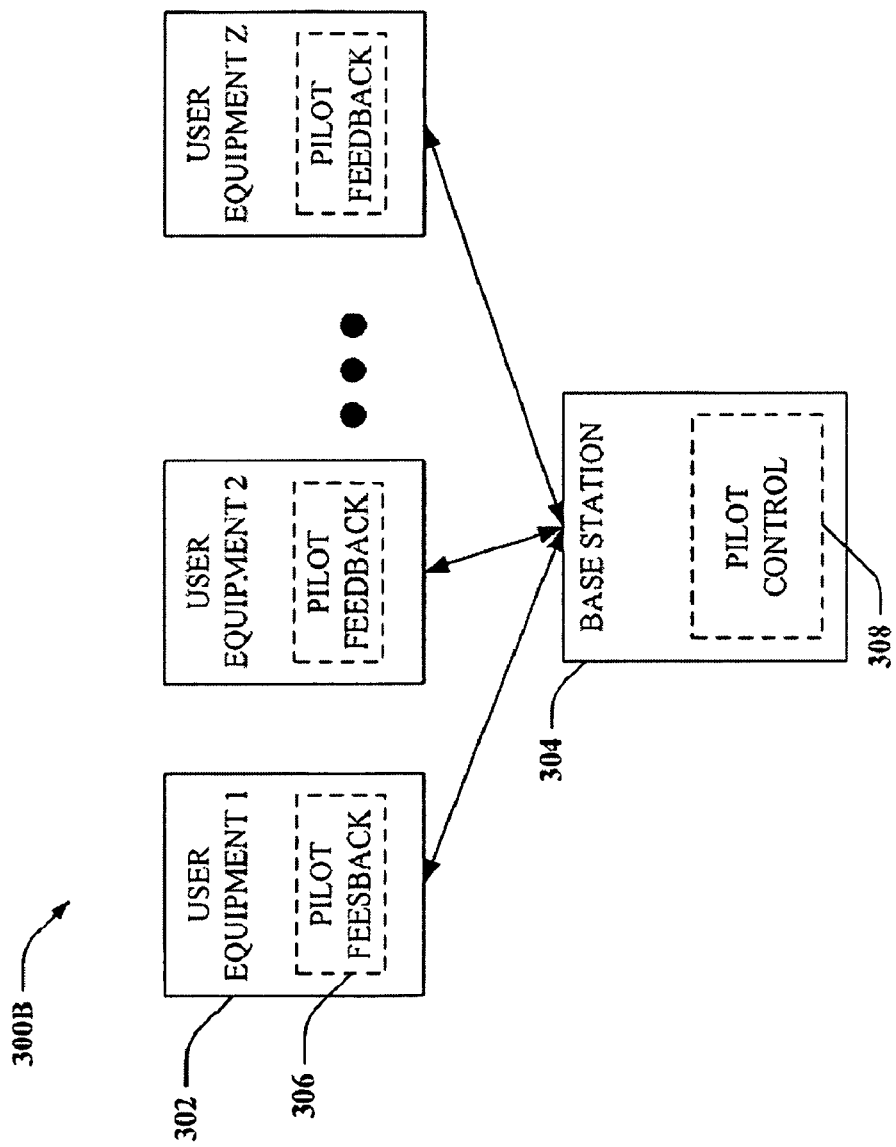
FIG. 3B illustrates a base station receiving signals from a plurality of user equipment such that uplink pilot signals can be optimized according to various aspects of the present invention.

FIG. 3B illustrates a base station 304 receiving signals from a plurality of UE 302 such dial uplink pilot signals are monitored according to various aspects of the herein described systems and methods. Base station 304 is shown receiving signals from a plurality of UE 302 (1 to Z), Z being an integer.

The following discussion provides additional background information regarding signaling between the network (e.g., base station 304 and or system controller 230) and the wireless terminal (e.g., UE 302 or UE 220) in the context of UMTS. In an aspect, logical channels are classified into Control Channels and Traffic Channels. Logical Control Channels comprise Broadcast Control Channel (BCCH), which is a downlink (DL) channel for broadcasting system control information. Paging Control Channel (PCCH), which is a downlink channel that transfers paging information. Multicast Control Channel (MCCH), which is point-to-multipoint downlink channel used for transmitting Multimedia Broadcast and Multicast Service (MBMS) scheduling and control information for one or several Multicast Traffic Channels (MTCHs). Generally, after establishing Radio Resource Control (RRC) connection, this channel is only used by UEs 302 that receive MBMS. Dedicated Control Channel (DCCH) is point-to-point bi-directional channel that transmits dedicated control information and used by UEs 302 having an RRC connection. In a further aspect, logical traffic channels comprise a Dedicated Traffic Channel (DTCH), which is point-to-point bi-directional channel, dedicated to one UE for the transfer of user information. Also, a MTCH for Point-to-multipoint downlink channel for transmitting traffic data.

In a further aspect, transport channels are classified into downlink and uplink. Downlink transport channels comprise the Dedicated Channel (DCH), the Broadcast Channel (BCH), the Forward Access Channel (FACH), the High Speed Downlink Shared Channel (HS-DSCH), and the Paging Channel (PCH), broadcasted over the entire cell and mapped to PHY resources, which can be used for other control/traffic channels. The uplink transport channels comprise the Dedicated Channel (DCH), the Enhanced Dedicated Channel (E-DCH), and the Random Access Channel (RACH). The PHY channels comprise a set of DL channels and UL channels.

For the purposes of description of a particular non-limiting embodiment of the invention, the following nomenclature is used. One having ordinary skill in the art would recognize that various modification could be made without departing from die spirit of the disclosed invention. Thus, it should be understood that the description herein is but one of many embodiments thai may be possible while keeping within the scope of the claims appended hereto. HS-DSCH is a High Speed Downlink Shared Channel, CPICH is a Common Pilot Channel, a Slot is a time duration of 0.666 milliseconds (ms).

Figure 4:
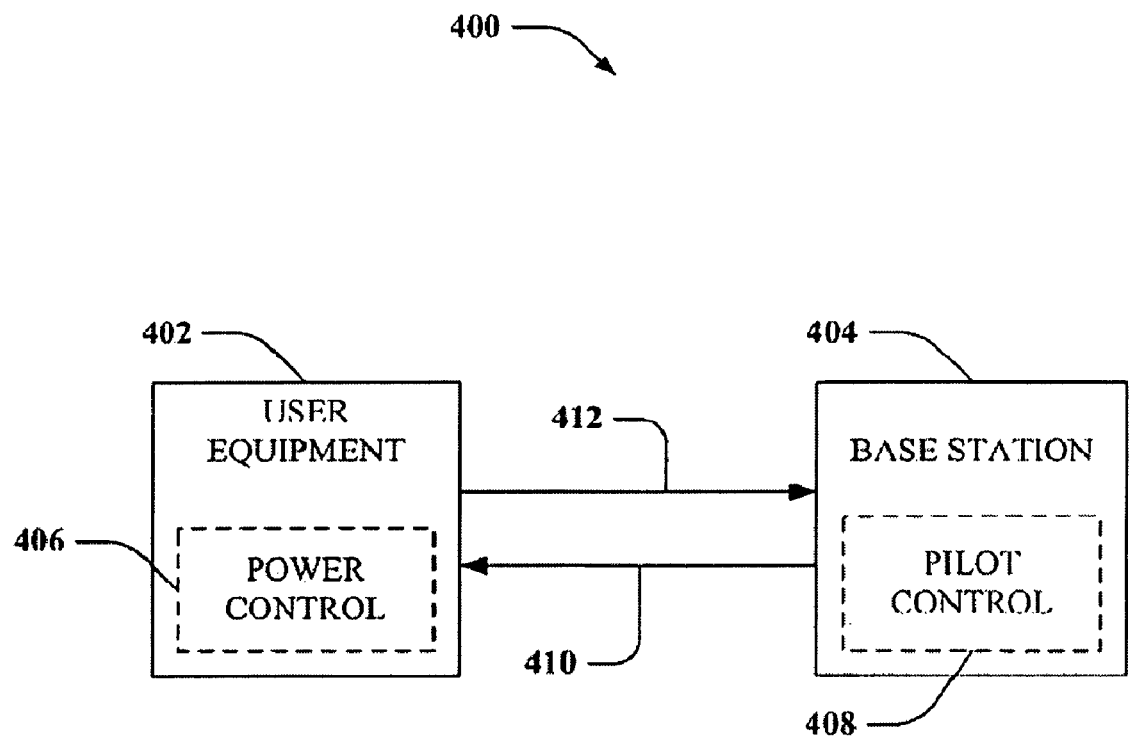
FIG. 4 depicts an exemplary a non-limiting pilot optimization scheme according to various aspects of the present invention.

FIG. 4 depicts an exemplary non-limiting pilot optimization illustrative implementation. As is shown, wireless communications system 400 comprises user equipment 402 and base station 404 operative to communicate data and operation signals over communications channels 412 and 410 (e.g., pilot channel). In an illustrative operation, base station pilot control mechanism 408 can monitor pilot channel conditions on user equipment 402 such that one or more power condition signals (not shown) can be provided to user equipment power control mechanism 406 operative to control the power of pilot channel (e.g., to perform a pilot boost) of user equipment 402 according to one or more selected conditions (e.g., high data rates). The power control can be performed according to one or more of the illustrated operations described herein (i.e., as described in the "Pilot Boost" section).

Figure 5:
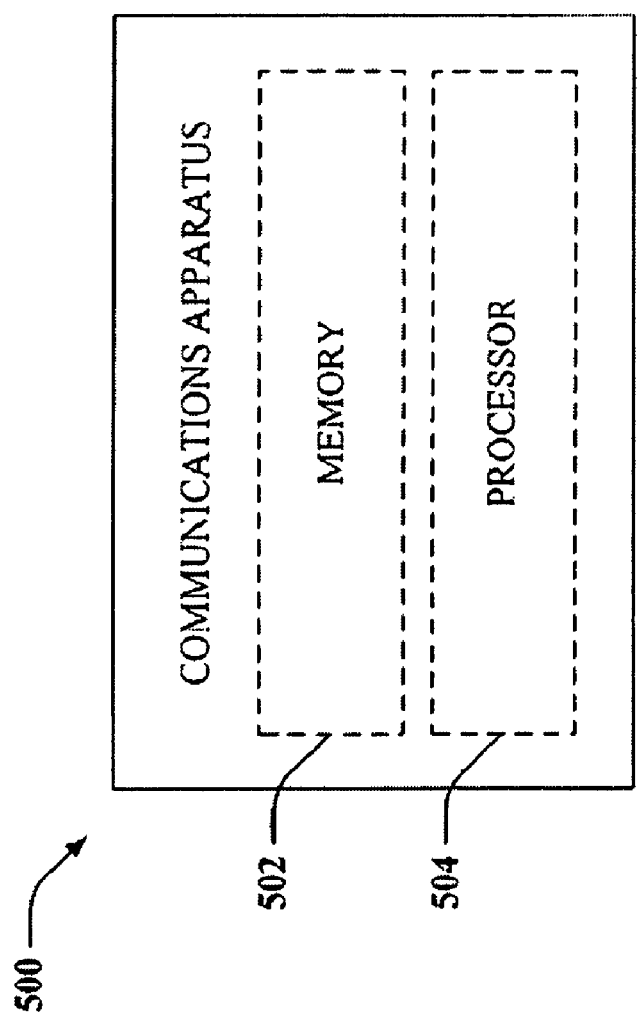
FIG. 5 illustrates a communications apparatus for employment within a wireless communications environment according to various aspects of the invention.

Now referring to FIG. 5, a communications apparatus 500 for employment within a wireless communications environment is illustrated. The apparatus 500 can be a base station 304 or a portion thereof or user equipment 302 or a portion thereof (such as a secure digital (SD) card coupled to a processor). Apparatus 500 can include a memory 502 that retains various instructions with respect to signal processing, scheduling communications, requesting measurement gaps, and/or the like. For instance, if apparatus 500 is user equipment as described below in connection with FIGS. 11-12 and 15, memory 502 can include instructions for analyzing quality of signals on an uplink and/or downlink channel with respect to a particular base station. Further, memory 502 can comprise instructions for pilot channel optimization. To that end, memory 502 can comprise instructions for receiving and processing uplink pilot channel data from a base station 304 in order to facilitate a pilot channel optimization according to a predetermined scheme, in accordance with various aspects of the herein described systems and methods. In addition, memory 502 can comprise instructions for facilitating transmission of the optimized pilot channel. The above example instructions and other suitable instructions can be retained within memory 502, and a processor 504 can be utilized in connection with executing the instructions (depending upon, for instance, number of active streams, frequency starting position, etc.).

Figure 9:
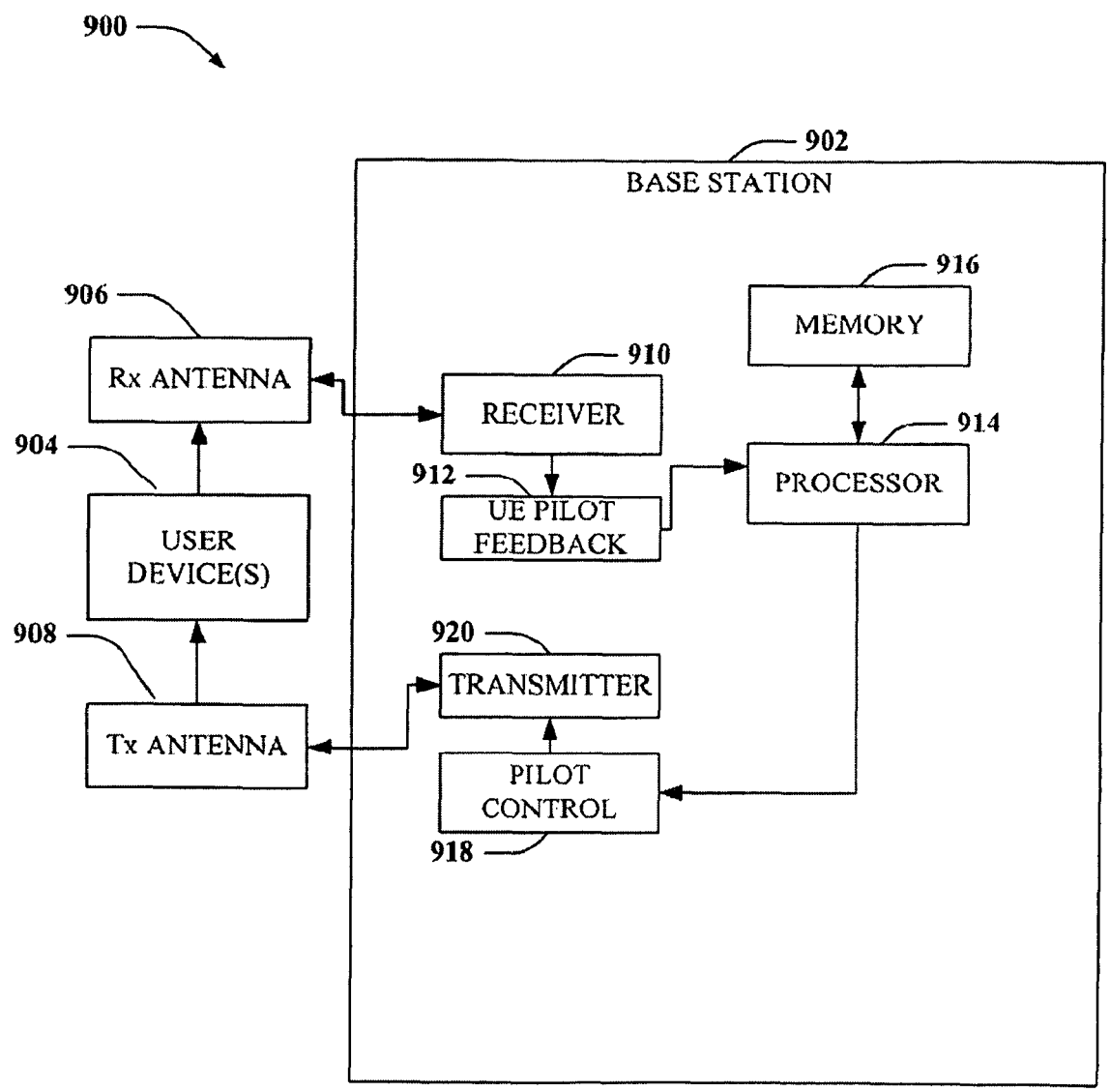
FIG. 9 illustrates a system that can be utilized in connection with pilot optimization with respect to user equipment in accordance with various embodiments.

Also, as staled above, apparatus 500 can be a base station and/or a portion thereof as described below in connection with FIGS. 9-10 and 14. As an example, memory 502 can include instructions for receiving an indication that user equipment serviced by apparatus 500 is taking measurements with respect to other technologies and/or frequencies. Memory 502 can additionally include instructions for determining and transmitting uplink pilot channel data n order to facilitate performing one or more power control operations on UE 302 according to a predetermined scheme, in accordance with various aspects of the herein described systems and methods. To that end, memory 502 can further include instructions for facilitating reception of the optimized pilot channel. Processor 504 can be employed to execute instructions retained within memory 502. While several examples have been provided, it is understood that instructions described in the form of methodologies (e.g., FIGS. 6-7) can be included within memory 502 and executed by processor 504.

Figure 6:
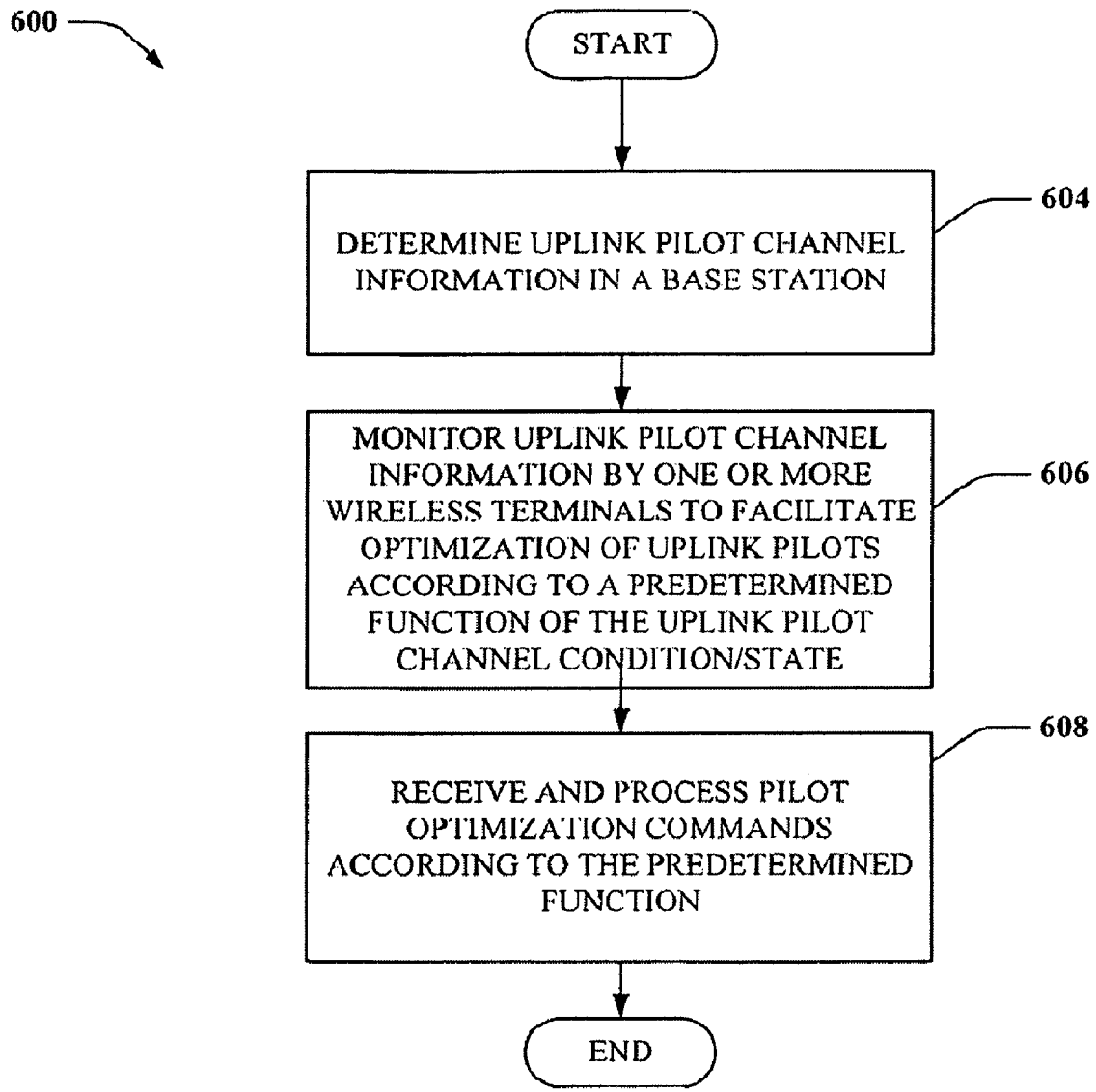
FIG. 6 illustrates an illustrative high-level methodology uplink pilot optimization in accordance with various embodiments described herein.
Figure 7:
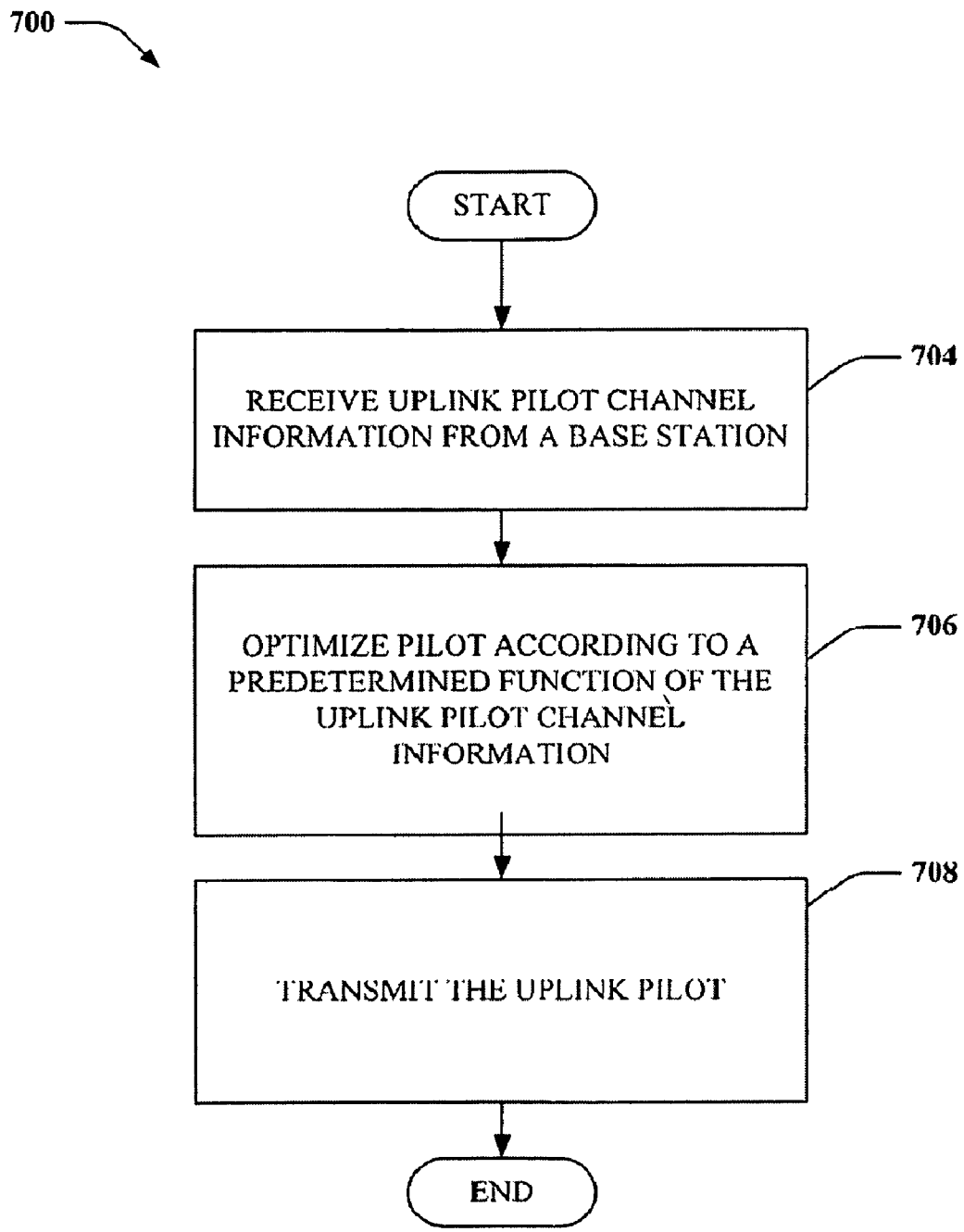
FIG. 7 illustrates an illustrative high-level methodology for uplink pilot optimization in accordance with various embodiments described herein.

Referring to FIGS. 6 and 7, particular high-level methodologies for optimizing pilot channel power conditions in accordance with various illustrative implementations are illustrated. While, for purposes of simplicity of explanation, the methodologies are shown and described as a series of acts, it is to be understood and appreciated that the methodologies are not limited by the order of acts, as some acts can occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with one or more embodiments.

FIG. 6 illustrates one particular high-level methodology 600 facilitating uplink pilot optimization in connection with pilot optimization schemes described herein. At 604, uplink pilot channel information necessary to facilitate pilot optimization scheme according to a predetermined function of the power of the pilot channel is determined by the base station 304 or a portion thereof. At 606, the respective uplink pilot channel information from one or more UE 302 to facilitate UE 302 pilot optimization according to the predetermined function related to the pilot channel condition and/or state. At 608, UE 302 receives and processes pilot optimization commands from base station 304, or a portion thereof, according to the predetermined function and the respective uplink pilot channel information.

FIG. 7 illustrates one particular high-level methodology 700 for facilitating uplink pilot optimization in connection with pilot optimization schemes described herein. In response to receiving respective uplink pilot channel information at 704 from a base station 304 or a portion thereof, UE 302 or a portion thereof controls the power of the pilot channel at 706 according to a predetermined function of the uplink pilot channel information. At 706, the UE 302 or a portion thereof transmits the power controlled pilot.

Figure 8:
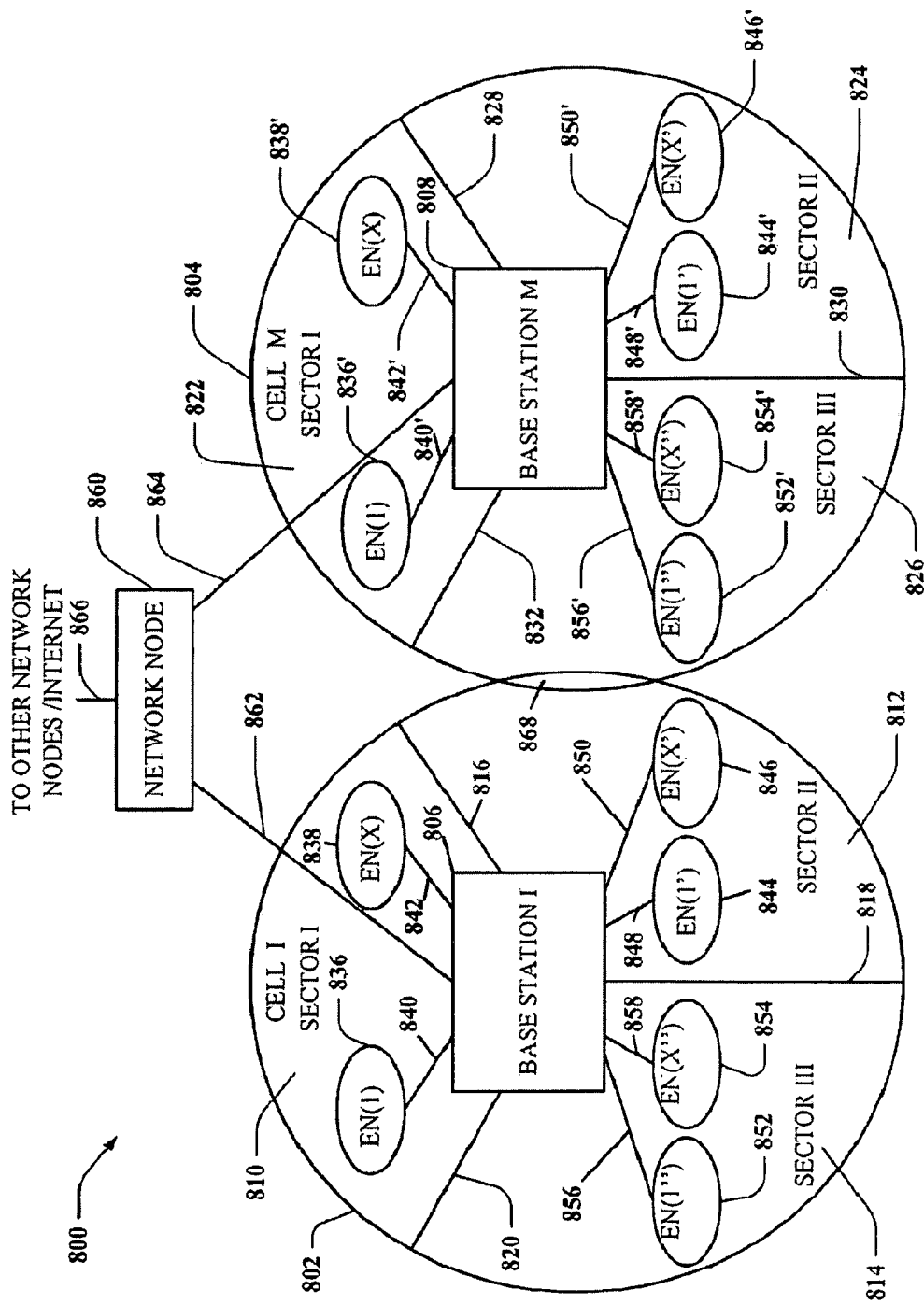
FIG. 8 illustrates an example communication system implemented in accordance with various aspects including multiple cells.

FIG. 8 depicts an example communication system 800 implemented in accordance with various aspects including multiple cells: cell I 802, cell M 804. Note that neighboring cells 802 and 804 overlap slightly, as indicated by cell boundary region 868, thereby creating potential for signal interference between signals transmitted by base stations in neighboring cells boundary regions; each boundary region is shared between two adjacent sectors.

Sector boundary regions provide potential for signal interference between signals transmitted by base stations in neighboring sectors. Line 816 represents a sector boundary region between sector I 810 and sector II 812; line 818 represents a sector boundary region between sector II 812 and sector III 814; line 820 represents a sector boundary region between sector III 814 and sector I 810. Similarly, cell M 804 includes a first sector, sector I 822, a second sector, sector II 824, and a third sector, sector III 826. Line 828 represents a sector boundary region between sector I 822 and sector II 824; line 830 represents a sector boundary region between sector II 824 and sector III 826; line 832 represents a boundary region between sector III 826 and sector I 822. Cell I 802 includes a base station (BS), base station I 806, and a plurality of end nodes (ENs) (e.g., wireless terminals) in each sector 810, 812, 814. Sector I 810 includes EN(1) 836 and EN(X) 838 coupled to BS 806 via wireless links 840, 842, respectively; sector II 812 includes EN(1') 844 and EN(X') 846 coupled to BS 806 via wireless links 848, 850, respectively; sector III 814 includes EN(1") 852 and EN(X") 854 coupled to BS 806 via wireless links 856, 858, respectively. Similarly, cell M 804 includes base station M 808, and a plurality of end nodes (ENs) in each sector 822, 824, 826. Sector I 822 includes EN(1) 836' and EN(X) 838' coupled to BS M 808 via wireless links 840', 842', respectively; sector II 824 includes EN(1') 844" and EN(X") 846' coupled to BS M 808 via wireless links 848', 850', respectively; sector 3 826 includes EN(1") 852' and EN(X") 854' coupled to BS 808 via wireless links 856', 858', respectively.

System 800 also includes a network node 860 which is coupled to BS I 806 and BS M 808 via network links 862, 864, respectively. Network node 860 is also coupled to other network nodes, e.g., other base stations, AAA server nodes, intermediate nodes, routers, etc. and the Internet via network link 866. Network links 862, 864, 866 can be, e.g., fiber optic cables. Each end node, e.g., EN(1) 836 can be a wireless terminal including a transmitter as well as a receiver. The wireless terminals, e.g., EN(1) 836 can move through system 800 and can communicate via wireless links with the base station in the cell in which the EN is currently located. The wireless terminals, (WTs), e.g., EN(1) 836, can communicate with peer nodes, e.g., other WTs in system 800 or outside system 800 via a base station, e.g., BS 806, and/or network node 860. WTs, e.g., EN(t) 836 can be mobile communications devices such as cell phones, personal data assistants with wireless modems, etc. Respective base stations or portions thereof can perform pilot uplink channel information determination and transmission. Additionally, respective base stations or portions thereof can perform uplink pilot demultiplexing according to the various aspects provided herein. The wireless terminals or portions thereof can use the provided respective uplink pilot channel information to facilitate adaptively multiplexing pilots by varying the pilot channel bandwidth and frequency location per SB 402 in time according to a predetermined function of the number of active streams according to the various aspects provided herein. Additionally, wireless terminals or portions thereof can transmit multiplexed pilots to the respective base stations FIG. 9 illustrates a system that can be utilized in connection with adaptive uplink pilot multiplexing schemes with respect to user equipment. System 900 comprises a base station 902 with a receiver 910 that receives signal (s) from one or more user devices 904 by way of one or more receive antennas 906, and transmits to the one or more user devices 904 through a plurality of transmit antennas 908. In one example, receive antennas 906 and transmit antennas 908 can be implemented using a single set of antennas. Receiver 910 can receive information from receive antennas 906 and is operatively associated with a demodulator 912 that demodulates received information. Receiver 910 can be, for example, a Rake receiver (e.g., a technique that individually processes multi-path signal components using a plurality of baseband correlators, . . . ), an MMSE-based receiver, or some other suitable receiver for separating out user devices assigned thereto, as will be appreciated by one skilled in the art. For instance, multiple receivers can be employed (e.g., one per receive antenna), and such receivers can communicate with each other to provide improved estimates of user data. Demodulated symbols are analyzed by a processor 914 similar to processor 1106 described below with regard to FIG. 11, and is coupled to a memory 916 that stores information related to user device assignments, lookup tables related thereto and the like. Receiver output for each antenna can be jointly processed by receiver 910 and/or processor 914. A modulator 918 can multiplex the signal for transmission by a transmitter 920 through transmit antennas 908 to user devices 904.

Figure 10:
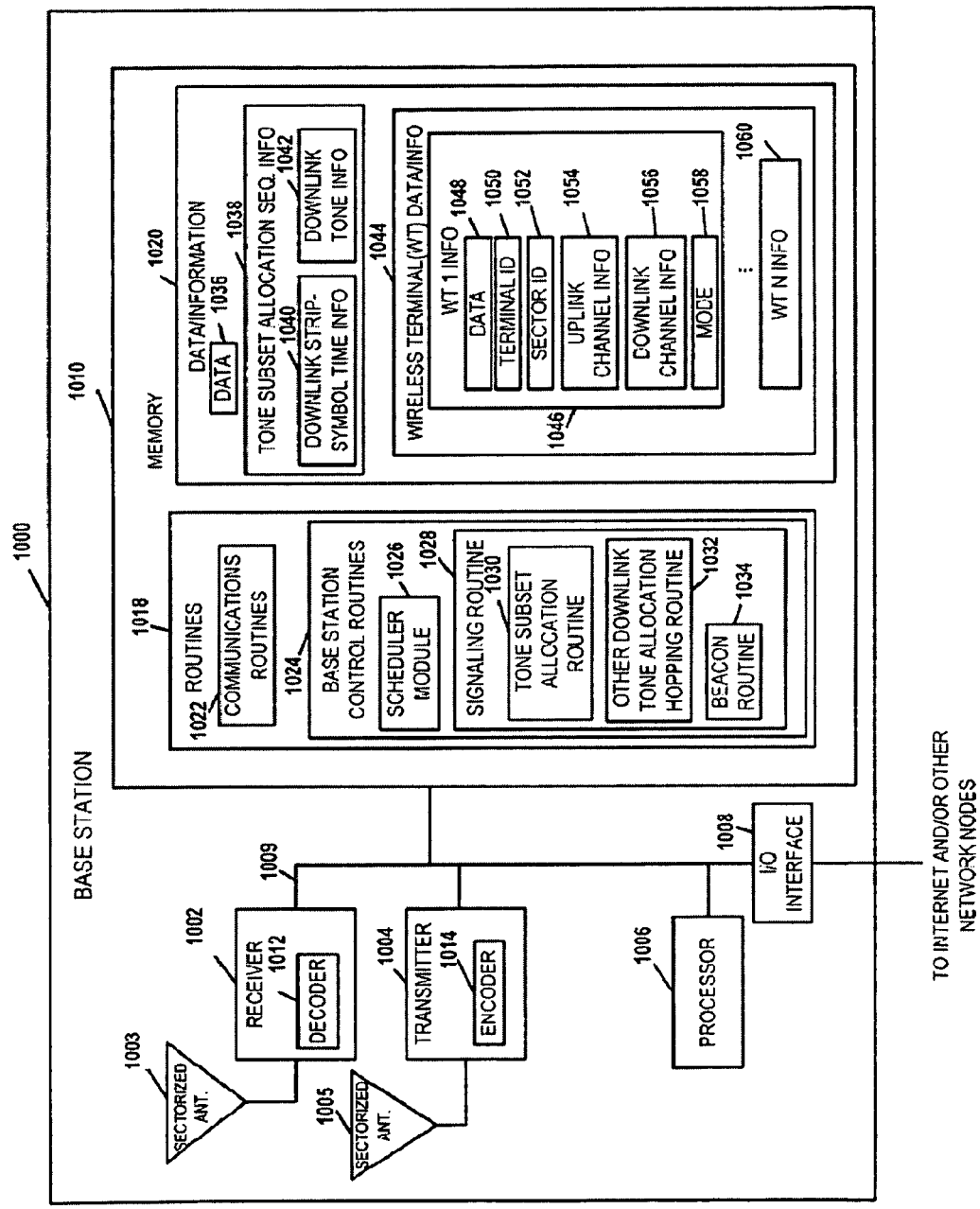
FIG. 10 illustrates an exemplary non-limiting block diagram of a base station in accordance with various aspects of the invention.

FIG. 10 illustrates an example base station 1000 in accordance with various aspects of the present invention. Base station 1000 or portions thereof implements various aspect of the herein described systems and methods. For example, base station 1000 can determine pilot uplink channel information determination for subsequent transmission to facilitate adaptive pilot multiplexing in associated user equipment. Base station 1000 can be used as any one of base stations 806, 808 of the system 800 of FIG. 8. The base station 1000 includes a receiver 1002, a transmitter 1004, a processor 1006, e.g., CPU, an input/output interface 1008 and memory 1010 coupled together by a bus 1009 over which various elements 1002, 1004, 1006, 1008, and 1010 can interchange data and information.

Sectorized antenna 1003 coupled to receiver 1002 is used for receiving data and other signals, e.g., channel reports, from wireless terminals transmissions from each sector within the base station's cell and can comprise one or more receive antennas. Sectorized antenna 1005 coupled to transmitter 1004 is used for transmitting data and other signals, e.g., control signals, pilot signal, beacon signals, etc. to wireless terminals 1200 (see FIG. 12) within each sector of the base station's cell. In various aspects, base station 1000 can employ multiple receivers 1002 and multiple transmitters 1004, e.g., an individual receiver 1002 for each sector and an individual transmitter 1004 for each sector. As described above, it is to be appreciated that various modifications are possible. For example, in a SU-MIMO system, multiple transmit and receive antennas, receivers, etc. in the base station and user equipment can be used. Similarly, for SDMA systems, multiple users can transmit and receive signals from a base station having multiple transmit and receive antennas, receivers, etc. Processor 1006, can be, e.g., a general purpose central processing unit (CPU). Processor 1006 controls operation of base station 1000 under direction of one or more routines 1018 stored in memory 1010 and implements the methods. I/O interface 1008 provides a connection to other network nodes, coupling the BS 1000 to other base stations, access routers, AAA server nodes, etc., other networks, and the Internet. Memory 1010 includes routines 1018 and data/information 1020.

Data/information 1020 includes data 1036, tone subset allocation sequence information 1038 including downlink strip-symbol time information 1040 and downlink tone information 1042, and wireless terminal (WT) data/info 1044 including a plurality of sets of WT information: WT 1 info 1046 and WT N info 1060. Each set of WT info, e.g., WT 1 info 1046 includes data 1048, terminal ID 1050, sector ID 1052, uplink channel information 1054, downlink channel information 1056, and mode information 1058.

Routines 1018 include communications routines 1022 and base station control routines 1024. Base station control routines 1024 includes a scheduler module 1026 and signaling routines 1028 including a tone subset allocation routine 1030 for strip-symbol periods, other downlink tone allocation hopping routine 1032 for the rest of symbol periods, e.g., non strip-symbol periods, and a beacon routine 1034.

Data 1036 includes data to be transmitted that will be sent to encoder 1014 of transmitter 1004 for encoding prior to transmission to WTs, and received data from WTs that has been processed through decoder 1012 of receiver 1002 following reception. Downlink strip-symbol time information 1040 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1042 includes information including a carrier frequency assigned to the base station 1000, the number and frequency of tones, and the set of tone subsets to be allocated to the strip-symbol periods, and other cell and sector specific values such as slope, slope index and sector type.

Data 1048 can include data that WT1 1200 has received from a peer node, data that WT 1 1200 desires to be transmitted to a peer node, and downlink channel quality report feedback information. Terminal ID 1050 is a base station 1000 assigned ID that identifies WT 1 1200. Sector ID 1052 includes information identifying the sector in which WT1 1200 is operating. Sector ID 1052 can be used, for example, to determine the sector type. Uplink channel information 1054 includes information identifying channel segments that have been allocated by scheduler 1026 for WT1 1200 to use, e.g., uplink traffic channel segments for data, dedicated uplink control channels for requests, power control, timing control, number of active streams etc. Each uplink channel assigned to WT1 1200 includes one or more logical tones, each logical tone following an uplink hopping sequence according to various aspects of the present invention. Downlink channel information 1056 includes information identifying channel segments that have been allocated by scheduler 1026 to carry data and/or information to WT1 1200, e.g., downlink traffic channel segments for user data. Each downlink channel assigned to WT1 1200 includes one or more logical tones, each following a downlink hopping sequence. Mode information 1058 includes information identifying the state of operation of WT1 1200, e.g. sleep, hold, on.

Communications routines 1022 control the base station 1000 to perform various communications operations and implement various communications protocols. Base station control routines 1024 are used to control the base station 1000 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 1028 controls the operation of receiver 1002 with its decoder 1012 and transmitter 1004 with its encoder 1014. The signaling routine 1028 is responsible for controlling the generation of transmitted data 1036 and control information. Tone subset allocation routine 1030 constructs the tone subset to be used in a strip-symbol period using the method of the aspect and using data/information 1020 including downlink strip-symbol time info 1040 and sector ID 1052. The downlink tone subset allocation sequences will be different for each sector type in a cell and different for adjacent cells. The WTs 1200 receive the signals in the strip-symbol periods in accordance with the downlink tone subset allocation sequences; the base station 1000 uses the same downlink tone subset allocation sequences in order to generate the transmitted signals. Other downlink tone allocation hopping routine 1032 constructs downlink tone hopping sequences, using information including downlink tone information 1042, and downlink channel information 1056, for the symbol periods other than the strip-symbol periods. The downlink data tone hopping sequences are synchronized across the sectors of a cell. Beacon routine 1034 controls the transmission of a beacon signal, e.g., a signal of relatively high power signal concentrated on one or a few tones, which can be used for synchronization purposes, e.g., to synchronize the frame timing structure of the downlink signal and therefore the tone subset allocation sequence with respect to an ultra-slot boundary.

Figure 11:
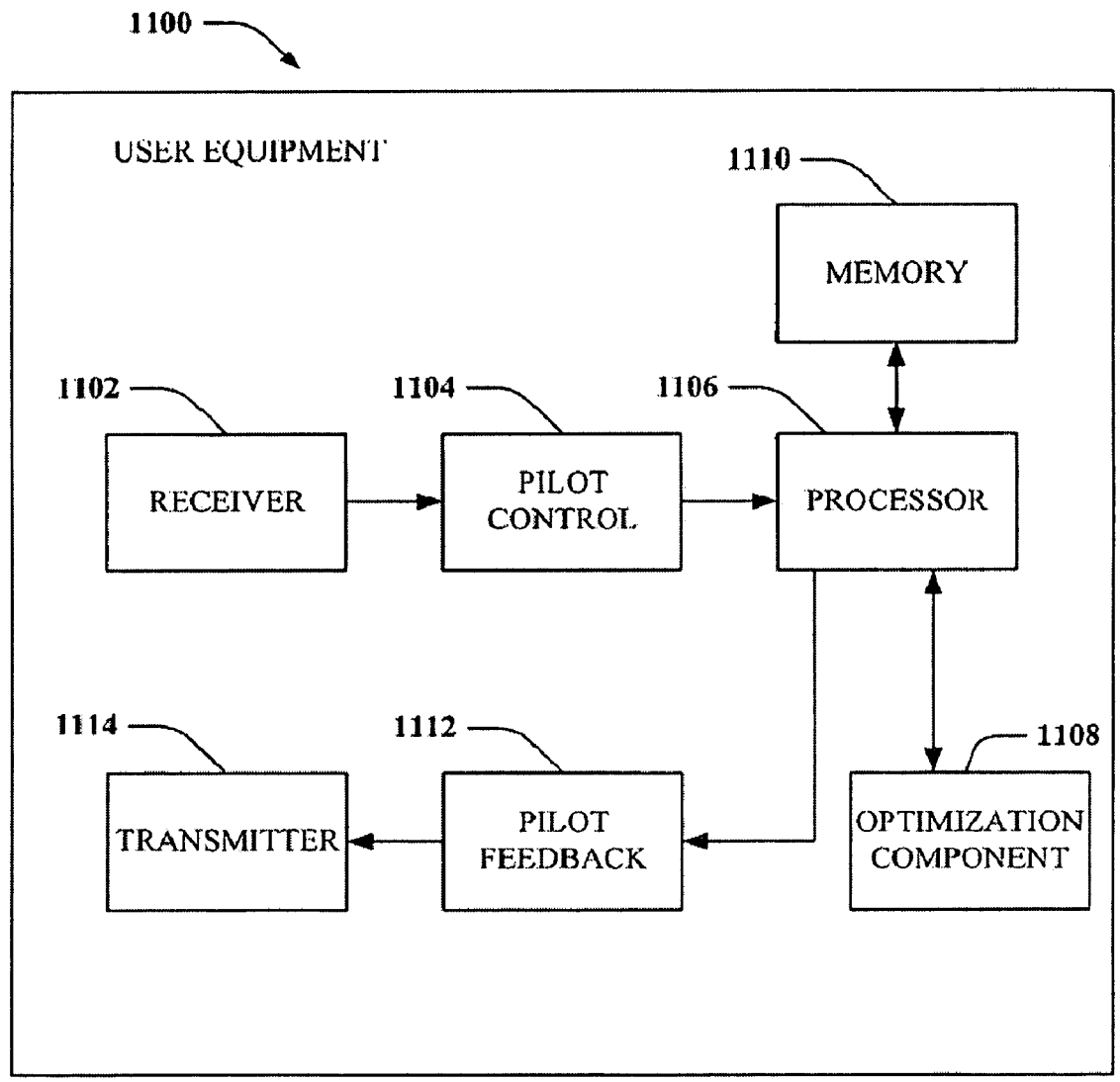
FIG. 11 illustrates a system that can be utilized in connection with uplink pilot channel allocation in accordance with various illustrative implementation.

FIG. 11 illustrates a system 1100 that can be utilized in connection with pilot optimization schemes as described herein. System 1100 comprises a receiver 1102 that receives a signal from, for instance, one or more receive antennas, and performs typical actions thereon (e.g., filters, amplifies, downconverts, . . . ) the received signal and digitizes the conditioned signal to obtain samples. A pilot control mechanism 1104 can provide received pilot symbols to a processor 1106 for channel estimation.

Processor 1106 can be a processor dedicated to analyzing information received by receiver component 1102 and/or generating information for transmission by a transmitter 1114. Processor 1106 can be a processor that controls one or more portions of system 1100, and/or a processor that analyzes information received by receiver 1102, generates information for transmission by a transmitter 1114, and controls one or more portions of system 1100. System 1100 can include an optimization component 1108 that can optimize performance of user equipment before, during, and/or after performance of measurements with respect to one or more technologies and/or frequencies. Optimization component 1108 can be incorporated into the processor 1106. It is to be appreciated that optimization component 1108 can include optimization code that performs utility based analysis in connection with requesting measurement gaps. The optimization code can utilize artificial intelligence based methods in connection with performing inference and/or probabilistic determinations and/or statistical-based determination in connection with encoding and decoding schemes.

System (user equipment) 1100 can additionally comprise memory 1110 that is operatively coupled to processor 1106 and that stores information such as measurement gap information, scheduling information, and the like, wherein such information can be employed in connection with allocating requesting measurement gaps and performing measurements during a measurement gap. Memory 1110 can additionally store protocols associated with generating lookup tables, etc., such that system 1100 can employ stored protocols and/or algorithms to increase system capacity. It will be appreciated that the data store (e.g., memories) components described herein can be either volatile memory or nonvolatile memory, or can include both volatile and nonvolatile memory. By way of illustration and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SKAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1110 is intended to comprise, without being limited to, these and any other suitable types of memory. Processor 1106 is connected to a symbol pilot feedback mechanism 1112 and transmitter 1114 that transmits the modulated signal.

Figure 12:
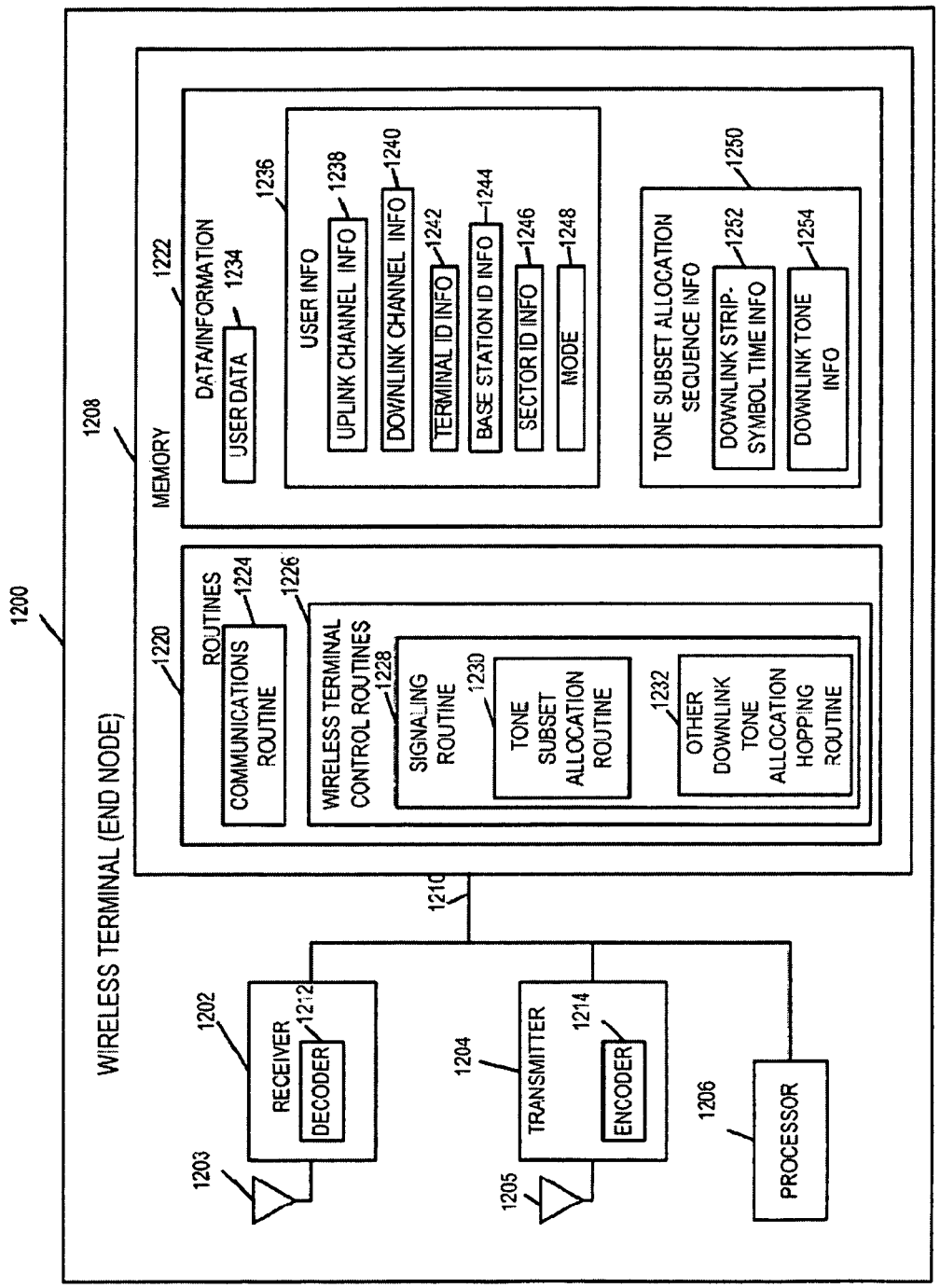
FIG. 12 illustrates an exemplary wireless terminal (e.g., wireless terminal, mobile device, end node, etc.) implemented in accordance with various illustrative implementations.

FIG. 12 illustrates an exemplary wireless terminal (e.g., end node, mobile device, etc.) 1200 which can be used as any one of the wireless terminals (e.g., EN(1) 836, of the system 800 shown in FIG. 8). Wireless terminal 1200 includes a receiver 1202 including a decoder 1212, a transmitter 1204 including an encoder 1214, a processor 1206, and memory 1208 which are coupled together by a bus 1210 over which the various elements 1202, 1204, 1206, 1208 can interchange data and information. Antenna 1203 used for receiving signals from a base station is coupled to receiver 1202. Antenna 1205 used for transmitting signals, e.g., to a base station is coupled to transmitter 1204. As described above, it is to be appreciated that various modifications are possible. For example, in a SU-MIMO system, multiple transmit and receive antennas, receivers, etc. in the base station and user equipment can be used. Similarly, for SDMA systems, multiple users can transmit and receive signals from a base station having multiple transmit and receive antennas, receivers, etc.

The processor 1206, e.g., a CPU controls die operation of the wireless terminal 1200 and implements methods by executing routines 1220 and using data/information 1222 in memory 1208.

Data/information 1222 includes user data 1234, user information 1236, and tone subset allocation sequence information 1250, in the example case of an OFDMA communication system. User data 1234 can include data, intended for a peer node, which can be routed to encoder 1214 for encoding prior to transmission by transmitter 1204 to base station 1000, and data received from the base station 1000 which has been processed by the decoder 1212 in receiver 1202. User information 1236 includes uplink channel information 1238, downlink channel information 1240, terminal ID information 1242, base station ID information 1244, sector ID information 1246, and mode information 1248. Uplink channel information 1238 includes information identifying uplink channels segments that have been assigned by base station 1000 for wireless terminal 1200 to use when transmitting to the base station 1000. Uplink channels can include uplink traffic channels, dedicated uplink control channels, e.g., request channels, power control channels and timing control channels. In the example case of an OFDMA communication system, each uplink channel includes one or more logic tones, each logical tone following an uplink tone flopping sequence, in some embodiments, the uplink hopping sequences are different between each sector type of a cell and between adjacent cells.

Downlink channel information 1240 includes information identifying downlink channel segments that have been assigned by a base station to WT 1200 for use when the base station is transmitting data/information to WT 1200. Downlink channels can include downlink traffic channels and assignment channels, each downlink channel including one or more logical tones, each logical tone following a downlink hopping sequence, which is synchronized between each sector of the cell.

User info 1236 also includes terminal ID information 1242, which is a base station 1000 assigned identification, base station ID information 1244 which identifies the specific base station 1000 that WT has established communications with, and sector ID info 1246 which identifies the specific sector of the cell where WT 1200 is presently located. In an example OFDMA communication system, base station ID 1244 provides a cell slope value and sector ID info 1246 provides a sector index type; the cell slope value and sector index type can be used to derive tone hopping sequences. Mode information 1248 also included in user info 1236 identifies whether the WT 1200 is in sleep mode, hold mode, or on mode.

In some OFDMA embodiments, tone subset allocation sequence information 1250 includes downlink strip-symbol time information 1252 and downlink tone information 1254. Downlink tone info 1254 includes information including a carrier frequency assigned to the base station 1000, the number and frequency of tones, and the set of tone subsets to be allocated to the strip-symbol periods, and other cell and sector specific values such as slope, slope index and sector type.

Routines 1220 include communications routines 1224 and wireless terminal control routines 1226. Communications routines 1224 control the various communications protocols used by WT 1200. Wireless terminal control routines 1226 controls basic wireless terminal 1200 functionality including the control of the receiver 1202 and transmitter 1204. Wireless terminal control routines 1226 include the signaling routine 1228. In some OFDMA embodiments, tone subset allocation routine 1230 uses user data/info 1222 including downlink channel information 1240, base station ID info 1244, e.g., slope index and sector type, and downlink tone information 1254 in order to generate the downlink tone subset allocation sequences in accordance with some embodiments and process received data transmitted from base station 1000.

The techniques of some illustrative implementation can be implemented using software, hardware and/or a combination of software and hardware. Some embodiments are directed to an apparatus, e.g., a mobile node such as a mobile terminal, a base station, or a communications system which implement some illustrative implementation. Some illustrative implementation are also directed to methods, e.g., method of controlling and/or operating mobile nodes, base stations and/or communications systems, e.g., hosts, in accordance with some illustrative implementations. Some illustrative implementations are also directed to machine readable medium, e.g., ROM, RAM, CDs, hard discs, etc., which include machine readable instructions for controlling a machine to implement one or more steps in accordance with some illustrative implementations.

In various illustrative implementations nodes described herein are implemented using one or more modules to perform the steps corresponding to one or more methods of some illustrative implementations, for example, signal processing, message generation and/or transmission steps. Thus, in some illustrative implementations various features of some illustrative implementations are implemented using modules. Such modules can be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, some embodiments are directed to a machine-readable medium including machine executable instructions for causing a machine, e.g., processor and associated hardware, to perform one or more of the steps of the above-described method(s).

Numerous additional variations on the methods and apparatus of some illustrative implementations described above will be apparent to those skilled in the art in view of the above description of some illustrative implementations. Such variations are to be considered within the scope of the respective illustrative implementations. The methods and apparatus of some illustrative implementations can be, and in various embodiments are, used with CDMA, orthogonal frequency division multiplexing (OFDM), SC-FDMA, and/or various other types of communications techniques which can be used to provide wireless communications links between access nodes and mobile nodes. In some illustrative implementations the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of some embodiments.

It will be appreciated that, in accordance with one or more aspects described herein, inferences can be made regarding determining uplink pilot channel information. As used herein, the term to "infer" or "inference" refers generally to the process of reasoning about or inferring states of the system, environment, and/or user, mobile device, active uplink streams, and base station from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to determining active uplink streams to facilitate adaptive uplink pilot multiplexing. In accordance with another example, an inference may be made related to estimating a probability of a desired signal being differentiate from one or more undesired signals based on a set of uplink pilot signals. It will be appreciated that the foregoing examples are illustrative in nature and are not intended to limit the number of inferences that can be made or the manner in which such inferences are made in conjunction with the various embodiments and/or methods described herein.

Figure 13:
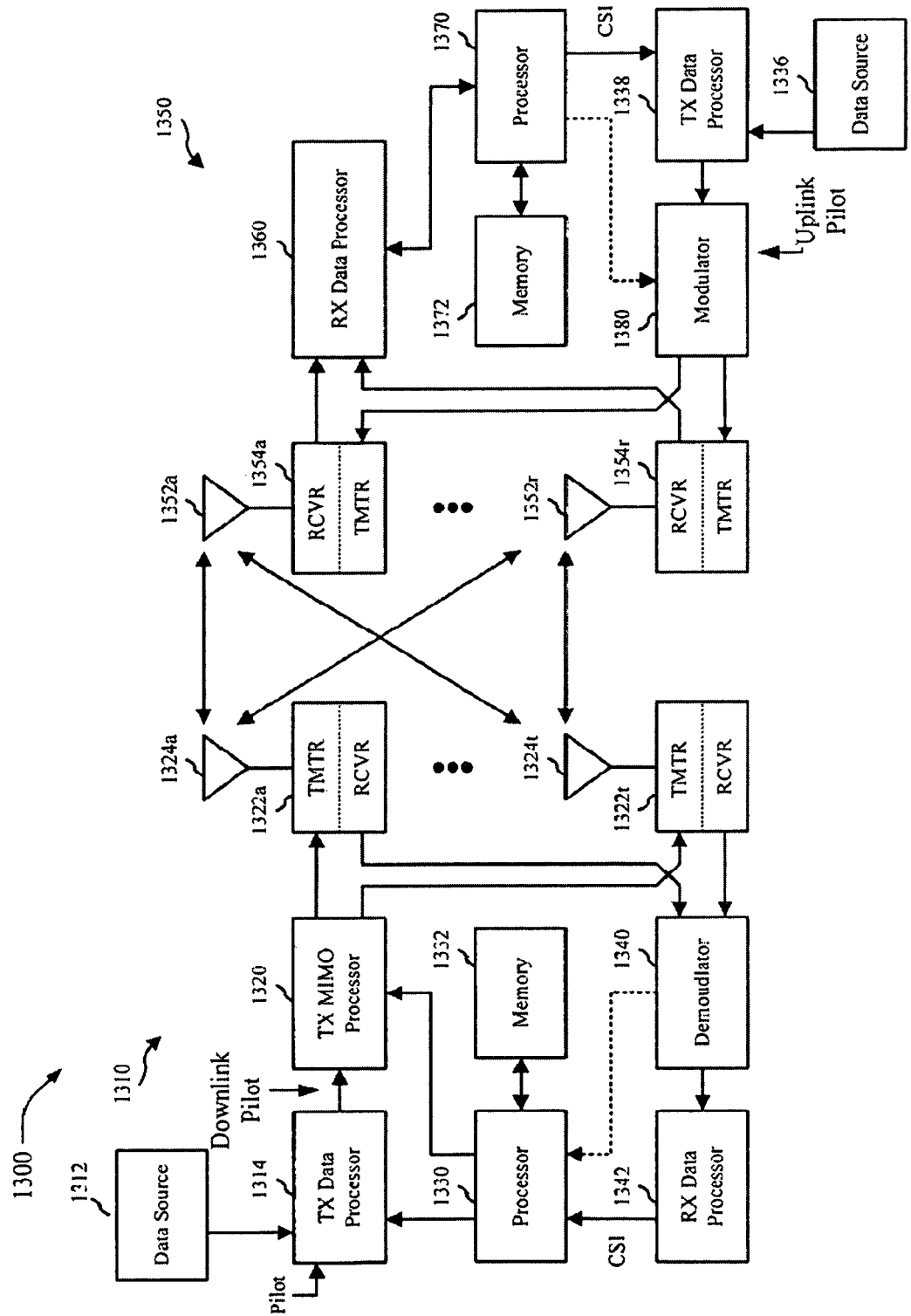
FIG. 13 illustrates an exemplary non-limiting block diagram of a communication system incorporating uplink pilot optimization in accordance with various aspects of the herein described illustrative implementations and operations.

FIG. 13 illustrates an exemplary non-limiting block diagram of a communication system incorporating pilot optimization in accordance with various aspects of the invention, where a transmitter system 1310 (e.g., base station, base station, etc.) and a receiver system 1350 (UE, user equipment, mobile node, etc.) in a MIMO system 1300. At the transmitter system 1310, traffic data for a number of data streams is provided from a data source 1312 to a transmit (TX) data processor 131-4. In an illustrative implementation, each data stream is transmitted over a respective transmit antenna. TX data processor 1314 formats, codes, and interleaves the traffic data for each data stream based on a particular coding scheme selected for that data stream to provide coded data. In accordance with various illustrative implementations of the herein described systems and methods, transmitter system 1310 facilitates pilot optimization schemes by transmitting to the receiver system 1350 uplink pilot channel information.

The coded data for each data stream can be multiplexed with pilot data using OFDM techniques. The pilot data is typically a known data pattern that is processed in a known manner and can be used at the receiver system to estimate the channel response. The data rate, coding, and modulation for each data stream may be determined by instructions performed by processor 1330.

The modulation symbols for all data streams are then provided to a TX processor 1320, which may further process the modulation symbols (e.g., for OFDM). TX processor 1320 then provides $N_T$ modulation symbol streams to $N_T$ transmitters (TMTR) 1322a through 1322t. In certain embodiments, TX processor 1320 applies beamforming weights to die symbols of the data streams and to the antenna from which the symbol is being transmitted.

Each transmitter 1322 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 1322a through 1322t are then transmitted from $N_T$ antennas 1324a through 1324t, respectively.

At receiver system 1350, the transmitted modulated signals are received by $N_R$ antennas 1352a through 1352r and the received signal from each antenna 1352 is provided to a respective receiver (RCVR) 1354a through 1354r. Each receiver 1354 conditions (e.g., filters, amplifies, and down-converts) a respective received signal, digitizes the conditioned signal to provide samples, and further processes the samples to provide a corresponding "received" symbol stream.

An RX data processor 1360 then receives and processes the $N_R$ received symbol streams from $N_R$ receivers 1354 based on a particular receiver processing technique to provide $N_T$ "detected" symbol streams. The RX data processor 1360 then demodulates, deinterleaves, and decodes each detected symbol stream to recover the traffic data for the data stream. The processing by RX data processor 1360 is complementary to that performed by TX MIMO processor 1320 and TX data processor 1314 at transmitter system 1310.

A processor 1370 periodically determines which pre-coding matrix to use as described above. Processor 1370 formulates a reverse link message comprising a matrix index portion and a rank value portion. The reverse link message may comprise various types of information regarding the communication link and/or the received data stream. In accordance with various aspects of the invention, in response to receiving respective uplink pilot channel information from transmitter system 1310, receiver system 1350 optimizes the pilot channel according to a predetermined function. The reverse link message is then processed by a TX data processor 1338, which also receives traffic data for a number of data streams from a data source 1336, modulated by a modulator 1380, conditioned by transmitters 1354a through 1354r, and transmitted back to transmitter system 1310.

At transmitter system 1310, the modulated signals from receiver system 1350 are received by antennas 1324, conditioned by receivers 1322, demodulated by a demodulator 1340, and processed by a RX data processor 1342 to extract the reverse link message transmitted by the receiver system 1350. Processor 1330 then determines which pre-coding matrix to use for determining the beamforming weights then processes the extracted message. According to various aspects of the invention, in response to receiving multiplexed pilots from receiver system 1350, transmitter system 1310, demultiplexes the multiplexed pilot channel according to the predetermined function and the respective uplink pilot channel information.

Figure 14:
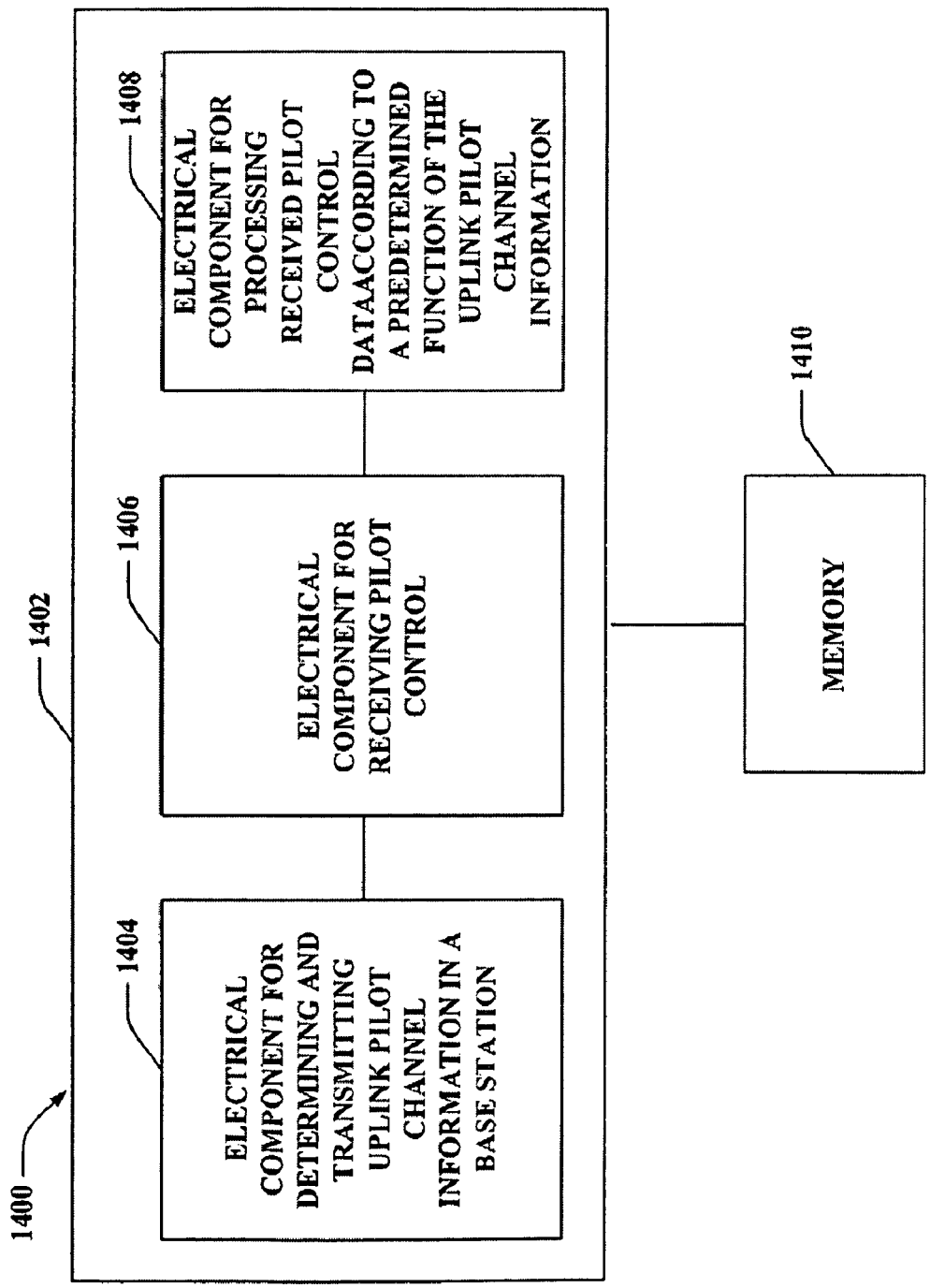
FIG. 14 illustrates an exemplary non-limiting apparatus that enables pilot optimization according to various illustrative implementations.

With reference to FIG. 14, illustrated is an apparatus 1400 that facilitates pilot optimization according to various non-limiting illustrative implementations of the herein described systems and methods. For example, apparatus 1400 may reside at least partially within a base station. It is to be appreciated that apparatus 1400 is represented as including functional blocks, which may be functional blocks that represent functions implemented by a processor, software, or combination thereof (e.g., firmware). Apparatus 1400 includes a logical grouping 1402 of electrical components that can act in conjunction. For instance, logical grouping 1402 can include an electrical component for determining and transmitting uplink pilot channel information in a base station 1404. For the purposes of illustration and not limitation, uplink pilot channel information can include a number of one or more active streams to be multiplexed, a number of available resource blocks, and/or a pilot starting frequency position, any combination thereof, and the like. Further, logical grouping 1402 can include an electrical component for receiving signals representative of pilot control 1406 as described in further detail supra in connection with FIG. 4, 6-7. Logical grouping 1402 can further include an electrical component for processing pilot control signals according to a predetermined function of the uplink pilot channel information 1408. Additionally, apparatus 1400 can include a memory 1410 that retains instructions for executing functions associated with electrical components 1404, 1406, and 1408. While shown as being external to memory 1410, it is to be understood that one or more of electrical components 1404, 1406, and 1408 may exist within memory 1410.

Figure 15:
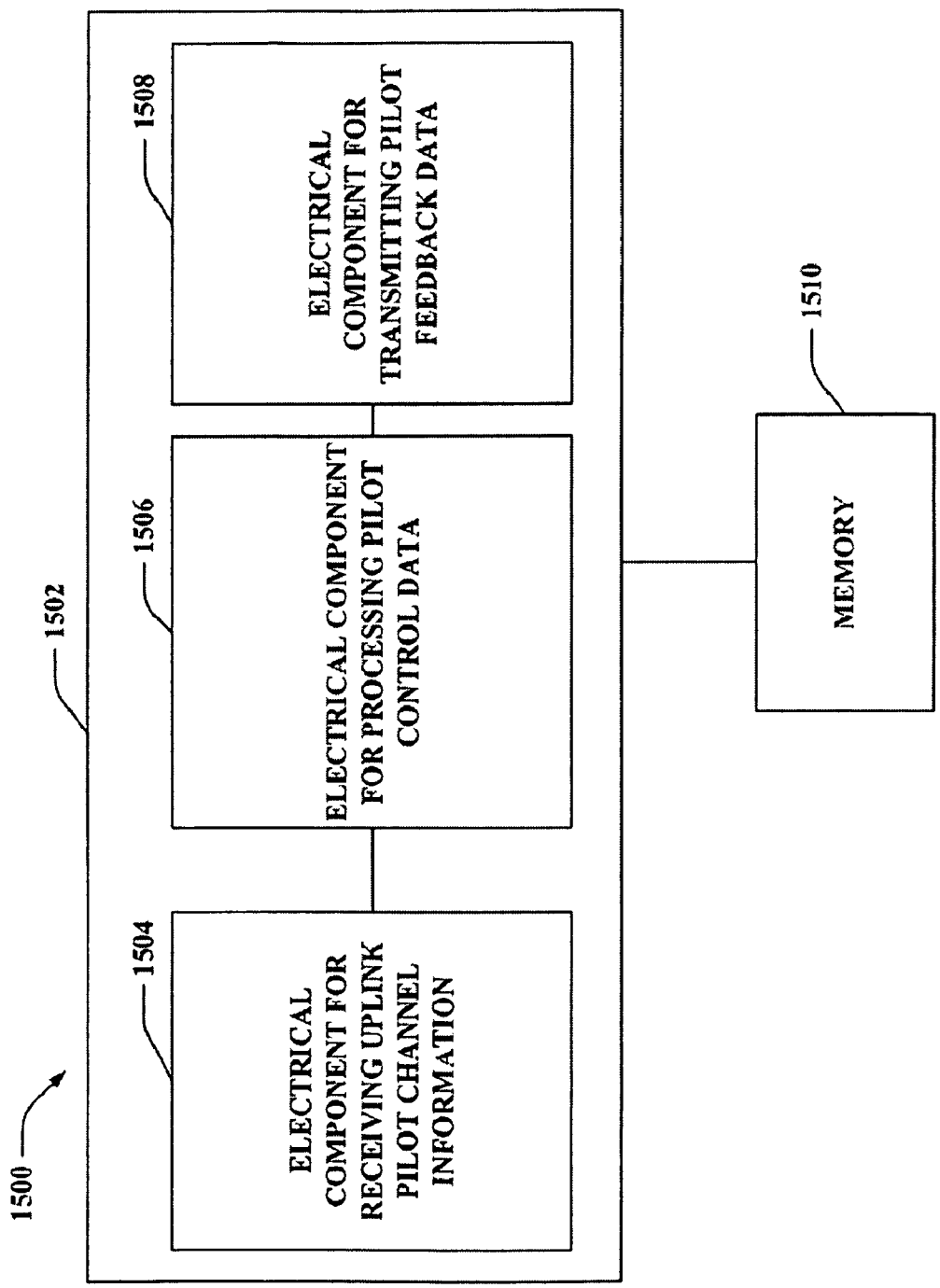
FIG. 15 illustrates an exemplary non-limiting apparatus that facilitates pilot optimization according to various illustrative implementations.

With reference to FIG. 15, illustrated is an apparatus 1500 that enables pilot optimization according to various non-limiting illustrative implementations of the herein described systems and methods. Apparatus 1500 may reside at least partially within a wireless terminal, for instance. It is to be appreciated that apparatus 1500 is represented as including functional blocks, which may be functional blocks that represent functions implemented by a processor, software, or combination thereof (e.g., firmware). Apparatus 1500 includes a logical grouping 1502 of electrical components that can act in conjunction. For instance, logical grouping 1502 may include an electrical component for receiving and processing uplink pilot channel information 1504. For example, electrical component 1504 can include an electrical component for receiving and processing uplink pilot channel information as described above with respect to FIG. 14. Further, logical grouping 1502 can include an electrical component for processing pilot control data depending on the uplink pilot channel information 1506 as described in further detail supra in connection with FIG. 4, 6-7. Further, logical grouping 1502 can include an electrical component for transmitting pilot feedback data 1508. Additionally, apparatus 1500 may include a memory 1510 that retains instructions for executing functions associated with electrical components 1504, 1506, and 1508. While shown as being external to memory 1510, it is to be understood that one or more of electrical components 1504, 1506, and 1508 may exist within memory 1510.

It is to be understood that the illustrative implementations described herein may be implemented by hardware, software, firmware, middleware, microcode, or any combination thereof. For a hardware implementation, the processing units within an user equipment or a network device may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the systems and/or methods described herein are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. A memory unit may be implemented within the processor or external to the processor, in which case it can be communicatively coupled to the processor through various means.

What has been described above includes examples of the disclosed subject matter. It is, of course, not possible to describe every conceivable combination of components or methodologies for purposes of describing such subject matter, but one of ordinary skill in the art may recognize that many further combinations and permutations are possible. Accordingly, the subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A method for pilot improvement in a wireless communication system, the method comprising:
 determining uplink pilot channel information in a base station;
 transmitting the uplink pilot channel information to one or more wireless terminals to facilitate pilot improvement by engaging in one or more selected pilot channel control operations; and
 monitoring and directing power operations performed on the one or more cooperating wireless terminals according to the selected one or more pilot channel operations,
 wherein the power operations performed on the one or more wireless terminals relate to the data rate and/or the pilot channel state of the one or more wireless terminals.

2. The method as recited in claim 1, further comprising autonomously increasing the level of the power of one or more control channels.

3. The method as recited in claim 1, further comprising autonomously increasing the level of the power of one or more control channels to a selected power level above a threshold power level as a function of the data rate of the data channel.

4. The method as recited claim 3, further comprising decreasing the power level of the one or more control channels to the threshold level.

5. The method as recited claim 1, further comprising increasing the power level of one or more enhanced control channels to a selected power level above a threshold power level.

6. The method as recited in claim 5, further comprising decoding the one or more enhanced control channels and flipping the modulation signals to transform the one or more enhanced control channels into a pilot reference.

7. The method as recited in claim 6, further comprising combining the pilot reference with one or more control channels to provide a phase and/or amplitude reference for demodulating other one or more control channels.

8. A method for pilot improvement in a wireless communication system, the method comprising:
receiving uplink pilot channel information from a base station;
processing received pilot channel information according to a predetermined function of the uplink pilot channel information to control one or more power operations at one or more cooperating wireless terminals; and
transmitting pilot feedback data to the base station representative of pilot channel operational state.

9. The method of claim 8, wherein the power control operations executed on the one or more wireless terminals is function of the transmission data rate between the one or more cooperating wireless terminals and the base station.

10. The method of claim 9, further comprising increasing the power of the pilot channel when transmitting above a threshold data rate.

11. The method of claim 10, further comprising decreasing the power of the pilot channel when transmitting below the threshold rate.

12. The method of claim 10, further comprising ignoring pilot commands from non-serving cells.

13. A communications apparatus, comprising:
a memory that retains instructions which determine uplink pilot channel information in a base station, transmit uplink pilot channel information, transmit an improved pilot signal for power control operations, and monitor the transmitted improved pilot signal according to a predetermined function of the uplink pilot channel information; and
a processor that is configured to execute the instructions within the memory.

14. The communications apparatus of claim 13, wherein the apparatus increases the power level of one or more enhanced control channels to a selected power level above a threshold power level.

15. The communications apparatus of claim 14, wherein the apparatus decodes the one or more enhanced control channels and flipping the modulation signals to transform the one or more enhanced control channels into a pilot reference.

16. The communications apparatus of claim 15, wherein the apparatus combines the pilot reference with one or more control channels to provide a phase and/or amplitude reference for demodulating other one or more control channels.

17. A communications apparatus, comprising:
a memory that retains instructions which receive uplink pilot channel information from a base station, process the uplink pilot channel information, perform one or more power control operations according to the received pilot channel information, and transmit pilot operation and state data; and
a processor that is configured to execute the instructions within the memory.

18. The communications apparatus of claim 17, wherein the one or more power control operations is a function of the transmission data rate.

19. The communications apparatus of claim 17, wherein the apparatus increases the power of the pilot channel when transmitting above a threshold data rate.

20. The communications apparatus of claim 17, wherein the apparatus decreases the power of the pilot channel when transmitting below the threshold rate.

21. A communications apparatus, comprising:
means for determining uplink pilot channel information in a base station;
means for transmitting an improved pilot signal for power control operations; and
means for monitoring the transmitted improved pilot signal according to a predetermined function of the uplink pilot channel information.

22. The communications apparatus of claim 21, wherein the apparatus increases the power level of one or more enhanced control channels to a selected power level above a threshold power level.

23. The communications apparatus of claim 21, wherein the apparatus decodes the one or more enhanced control channels and flipping the modulation signals to transform the one or more enhanced control channels into a pilot reference.

24. The communications apparatus of claim 21, wherein the apparatus combines the pilot reference with one or more control channels to provide a phase and/or amplitude reference for demodulating other one or more control channels.

25. A communications apparatus, comprising:
means for receiving uplink pilot channel information from a base station;
means for processing the uplink pilot channel information;
means for performing one or more power control operations according to the received pilot channel information; and
means for transmitting pilot operation and state data.

26. The communications apparatus of claim 25, wherein the one or more power control operations is a function of a transmission data rate.

27. The communications apparatus of claim 25, wherein the apparatus increases the power of the pilot channel when transmitting above a threshold data rate.

28. The communications apparatus of claim 25, wherein the apparatus decreases the power of the pilot channel when transmitting below the threshold rate.

29. A non-transitory machine-readable medium having computer-executable instructions stored thereon for:
determining uplink pilot channel information in a base station, transmitting the uplink pilot channel information, transmitting an improved pilot signal for power control operations, and monitoring the transmitted improved pilot signal according to a predetermined function of the uplink pilot channel information.

30. The non-transitory machine-readable medium of claim 29 further comprising computer-executable instructions stored thereon for increasing a power level of one or more enhanced control channels to a selected power level above a threshold power level.

31. The non-transitory machine-readable medium of claim 29 further comprising computer-executable instructions stored thereon for decoding the one or more enhanced control channels and flipping the modulation signals to transform the one or more enhanced control channels into a pilot reference.

32. The non-transitory machine-readable medium of claim 30 further comprising computer-executable instructions stored thereon for combining the pilot reference with one or more control channels to provide a phase and/or amplitude reference for demodulating other one or more control channels.

33. A non-transitory machine-readable medium having computer-executable instructions stored thereon for:
receiving uplink pilot channel information from a base station, processing the uplink pilot channel information, performing one or more power control operations according to the received pilot channel information, and transmitting pilot operation and state data.

34. The non-transitory machine-readable medium of claim 33 further comprising computer-executable instructions stored thereon for increasing the power of the pilot channel when transmitting above a threshold data rate.

35. The non-transitory machine-readable medium of claim 33 further comprising computer-executable instructions stored thereon for decreasing the power of the pilot channel when transmitting below the threshold rate.

36. The non-transitory machine-readable medium of claim 33 further comprising computer-executable instructions stored thereon for ignoring pilot commands from non-serving cells.

37. In a wireless communication system, an apparatus comprising:
a processor configured to:
determine uplink pilot channel information in a base station;
transmit the uplink pilot channel information to one or more cooperating wireless terminals to facilitate pilot improvement by engaging in one or more selected pilot channel control operations; and
monitor and directing power operations performed on the one or more cooperating wireless terminals according to the selected one or more pilot channel operations,
wherein the power operations performed on the one or more cooperating wireless terminals relate to the data rate and/or the pilot channel state of the one or more cooperating wireless terminals.

38. The communications apparatus of claim 37, wherein the processor provides a signal to increase the power level of one or more enhanced control channels to a selected power level above a threshold power level.

39. The communications apparatus of claim 37, wherein the processor provides a signal to decode the one or more enhanced control channels and flipping the modulation signals to transform the one or more enhanced control channels into a pilot reference.

40. The communications apparatus of claim 38, wherein the processor provides a signal to combine the pilot reference with one or more control channels to provide a phase and/or amplitude reference for demodulating other one or more control channels.

41. In a wireless communication system, an apparatus comprising:
a processor configured to:
receive uplink pilot channel information from a base station;
process received pilot channel information according to a predetermined function of the uplink pilot channel information to control one or more power operations at one or more cooperating wireless terminals; and
transmit pilot feedback data to the base station representative of pilot channel operational state.

42. The communications apparatus of claim 41, wherein the processor provides a signal to increase the power of the pilot channel when transmitting above a threshold data rate.

43. The communications apparatus of claim 41, wherein the processor provides a signal to decrease the power of the pilot channel when transmitting below the threshold rate.

44. The communications apparatus of claim 41, wherein the processor provides a signal to ignore pilot commands from non-serving cells.

* * * * *